United States Patent
Masumoto et al.

(10) Patent No.: US 7,369,262 B2
(45) Date of Patent: May 6, 2008

(54) IMAGE REPRODUCTION DEVICE AND IMAGE REPRODUCTION METHOD

(75) Inventors: Junji Masumoto, Ibaraki (JP); Yasuaki Sakanishi, Takatsuki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 610 days.

(21) Appl. No.: 10/510,049

(22) PCT Filed: Mar. 31, 2003

(86) PCT No.: PCT/JP03/04161

§ 371 (c)(1),
(2), (4) Date: Oct. 1, 2004

(87) PCT Pub. No.: WO03/084223

PCT Pub. Date: Oct. 9, 2003

(65) Prior Publication Data

US 2005/0200725 A1    Sep. 15, 2005

(30) Foreign Application Priority Data

Apr. 1, 2002    (JP) .............................. 2002-098365

(51) Int. Cl.
*G06K 15/00* (2006.01)
(52) U.S. Cl. .................. 358/1.16; 358/1.15; 348/207.2
(58) Field of Classification Search ................ 358/1.15, 358/1.16; 348/207.1, 207.2; 715/838
See application file for complete search history.

(56) References Cited

U.S. PATENT DOCUMENTS 7,057,751 B1*    6/2006    Shiraiwa ..................... 358/1.15
2002/0003963 A1*    1/2002    Ohkubo et al. ............. 396/429

FOREIGN PATENT DOCUMENTS

| JP | 5-137103 A | 6/1993 |
|---|---|---|
| JP | 5-207409 A | 8/1993 |
| JP | 6-290573 A | 10/1994 |
| JP | 8-70431 A | 3/1996 |
| JP | 9-284700 A | 10/1997 |
| JP | 11-146269 A | 5/1999 |
| JP | 11-331739 A | 11/1999 |
| JP | 2000-138894 A | 5/2000 |
| JP | 2000-182311 A | 6/2000 |
| JP | 2000-251486 A | 9/2000 |
| JP | 2001-94924 A | 4/2001 |
| JP | 2001-257980 A | 9/2001 |
| JP | 2002-57820 A | 2/2002 |
| JP | 2002-209190 A | 7/2002 |

* cited by examiner

*Primary Examiner*—King Y. Poon
*Assistant Examiner*—Nathan K Tyler
(74) *Attorney, Agent, or Firm*—Smith Patent Office

(57) ABSTRACT

In a case where a thumbnail image is displayed at the time of insertion of an image file storage medium including an automatic reproduction file, the thumbnail image is displayed only for the image file which contains description of automatic reproduction in an automatic reproduction file. Also, a thumbnail image of an image file which contains description of non-automatic reproduction in the automatic reproduction file is replaced with a dummy image or displayed as a thumbnail image not apparently capable of being recognized in response to a user request.

11 Claims, 20 Drawing Sheets

| Thumbnail Image ABC0002 | ~6 |
| ABC0002.JPG | |
| Thumbnail Image ABC0005 | |
| ABC0005.JPG | |
| Thumbnail Image ABC0009 | |
| ABC0009.JPG | |

IMAGE REPRODUCTION DEVICE AND IMAGE REPRODUCTION METHOD

TECHNICAL FIELD

The present invention relates to an image reproduction device and an image reproduction method in which an image file storage medium such as a CF card or an SD card having a function of automatically reproducing a stored image file is inserted into an image display device such as a projector or a plasma display to carry out a presentation using the automatic reproduction function.

BACKGROUND ART

In recent years, use of a digital camera has begun to extend explosively due to improved image quality and decreased price coupled with an improved performance of a personal computer and a color printer. With this as a background, with intention of further extending ownership of the digital camera, various companies have proposed various standards for a method of storing related information such as image pickup conditions of the digital camera and a method of improving an interface with the color printer. On the other hand, a home-use projector is coming to be widely used due to reduced size, weight and price of the body thereof. In the near future, an image picked up by the digital camera is expected to be enjoyed by use of a projector even in ordinary home.

FIG. 1 shows a flowchart for a conventional method of displaying a thumbnail image in an image reproduction device meeting reproduction specifications of a conventional automatic reproduction file.

First, a user inserts an image file storage medium containing an image picked up by a digital camera, into an image reproduction device. An image file storage medium has stored therein a plurality of image files and an automatic reproduction file for automatically setting the image files in an automatic reproduction mode. FIG. 2 shows an example of a file configuration of the image file storage medium. FIG. 2 shows an image file configuration based on DPOF specifications disclosed by four companies including Matsushita Electric Industrial Co., Ltd. The file configuration in the image file storage medium is such that a DCIM folder for storing an ordinary image file and a MISC folder for storing the control information such as automatic reproduction file information are arranged under a ROOT directory. The ordinary image files including ABC0001.JPG, ABC0002.JPG and the like are all placed in the lowest layer of the DCIM folder. An AUTPRTINT.MRK file in the MISC folder is an automatic print file, a UNICODE.MRK file is a unicode character string description file, and an AUTXFER.MRK is an automatic transmission control file. Also, an AUTPLAYn.MRK file is an automatic reproduction file. This automatic reproduction file has stored therein the control information for controlling automatic reproduction of these image files. This control information concerns designation and order of the image file and interval of image transmission time for automatic reproduction. For example, in a case where 10 image files including ABC0001.JPG to ABC0010.JPG are arranged in the lowest layer of the DCIM folder, and three images of ABC0002.JPG, ABC0005.JPG and ABC0009.JPG are designated as automatic reproduction files, the image reproduction device automatically displays only the three image files in that order on a display unit, but does not display the other seven image files.

The image display device can display a list of a plurality of thumbnail images composed of 160×120 pixels. FIG. 3 shows an example configuration of the image file. Generally, the image file picked up by the digital camera and compressed by JPEG scheme is formed of an application marker block, the number of pixels, quantization table and the like (JPEG header) and a compressed data area of a main image. The application marker block has stored therein image-related information such as image pickup conditions and a thumbnail, i.e., the JPEG code with 160×120 pixels compressed, and the JPEG-compressed data of the thumbnail as well as the number of pixels and the quantization table are also held in the thumbnail region. Characters SOI designates a start marker and EOI an end marker.

Now, in FIG. 1, the image file storage medium is inserted into the image reproduction device and a reproduction process is started. First, the presence or absence of the automatic reproduction file is detected. In the presence of the automatic reproduction file, the file is read (step S1). It is then checked whether a thumbnail display is requested or not (step S2), and in the absence of the request, the image file is sequentially automatically reproduced in line with contents described in the automatic reproduction file (steps S3, S4). In a case where the thumbnail display request is input by interruption from an external arbitrary input unit, the process proceeds from step S2 to step S5. The image reproduction device retrieves thumbnail image data of all the image files in the lowest layer of the DCIM folder from the image file storage medium, and displays a thumbnail image list on a display (step S6).

In a case where the operation described above is performed, however, all the thumbnail images are displayed as a list regardless of the information in the automatic reproduction file. Assuming that a large-sized display device such as a projector or a PDP on which a plurality of viewers can view one screen at the same time is used as a display of the image reproduction device, it becomes no problem at the time of normal automatic reproduction because image data not desirably displayed to the viewers are not displayed by internal setting of the automatic reproduction file. In a case where thumbnail display is carried out with intention of searching the image files in the image file storage medium, however, it becomes a problem that the image data not desirably viewed by the viewers are also displayed.

DISCLOSURE OF THE INVENTION

An image reproduction device according to the invention is for displaying an image of an image file storage medium having stored therein a plurality of image files in an arbitrary format for storing main image information and thumbnail image information and an automatic reproduction file containing at least description of permitting automatic reproduction of the plurality of the image files or not and the order in which they are reproduced. The image reproduction device according to this invention thus comprises a read unit which reads each file information stored in the image file storage medium, a control unit which performs the control operation to read the thumbnail image of the image file containing the description of permitting automatic reproduction, from the image file storage medium based on the automatic reproduction file read by the read unit, an image development unit which develops the image file read by the read unit, a storage element which writes the image data developed by the image development unit, and an image display unit which reads the thumbnail image written in the storage element and which displays it as a list. As a result, even the thumbnail image can not be displayed in such a manner as not to display the image data which the owner of the image file storage data does not desire to display to the third-party viewers.

The storage element is for holding the dummy image data corresponding to the thumbnail image. The control unit may alternatively perform the control operation in such a manner that a dummy image is read from the storage element in place of the thumbnail image of the image file which contains the description of non-automatic reproduction in the automatic reproduction file read by the read unit. As a result, the image data which the owner of the image file storage medium does not desire to display to third-party viewers is prevented from being displayed while at the same time making it possible to notify the owner of the image file storage medium that the image file is present which contains the description of non-automatic reproduction in the automatic reproduction file.

As another alternative, the image reproduction device further comprises an input unit which selectively determines whether the thumbnail image is displayed as a dummy image or a thumbnail image. In a case where the input unit selects the thumbnail image, the control unit reads the thumbnail image from the image file storage medium, while in a case where the input unit selects a dummy image, the control unit reads the dummy image from the storage element. As a result, the owner of the image file storage medium can selectively determine whether an image that has been designated as an image data not desirably displayed to third-party viewers is to be displayed or not in accordance with the scene involved on the image reproduction device, thereby contributing to an improved operating convenience.

The image development unit develops as a normal image the thumbnail image of the image file which contains the description of automatic reproduction in the automatic reproduction file read by the read unit. At the same time, the image development unit may develop the thumbnail image of the image file which contains the description of non-automatic reproduction as an image difficult to recognize. As a result, the image file which contains the description of non-automatic reproduction can be recognized only by the owner of the image file medium in displaying the thumbnail image.

The storage element holds first and second different dummy image data corresponding to the thumbnail image. The control unit performs the control operation in such a manner as to read the first dummy image from the storage element in place of the thumbnail image of the image file which contains the description of non-automatic reproduction in the automatic reproduction file. As an alternative, in a case where the thumbnail image of the image file which contains the description of automatic reproduction is not stored in the automatic reproduction file information, the second dummy image is read from the storage element. This process facilitates the judgment whether a given image file is the one which contains the description of non-automatic reproduction in the automatic reproduction file or the one which contains the description of automatic reproduction is contained in the automatic reproduction file but the thumbnail image is not stored in the image file.

The image reproduction device may further comprise an input unit which selectively determines whether the display of the first dummy image for the thumbnail image is canceled or not. In a case where the input unit cancels display of the dummy image, the control unit performs the control operation in such a manner as to read the thumbnail image corresponding to the particular image from the image file. As a result, the designation of non-automatic reproduction is canceled on the image reproduction device for the thumbnail display of the image file which contains the description of non-automatic reproduction in the automatic reproduction file, so that the thumbnail image data held in the image file can be displayed.

BEST MODE FOR CARRYING OUT THE INVENTION

First Embodiment

A first embodiment of the invention is explained below with reference to FIGS. 4 to 8.

Figure 4:
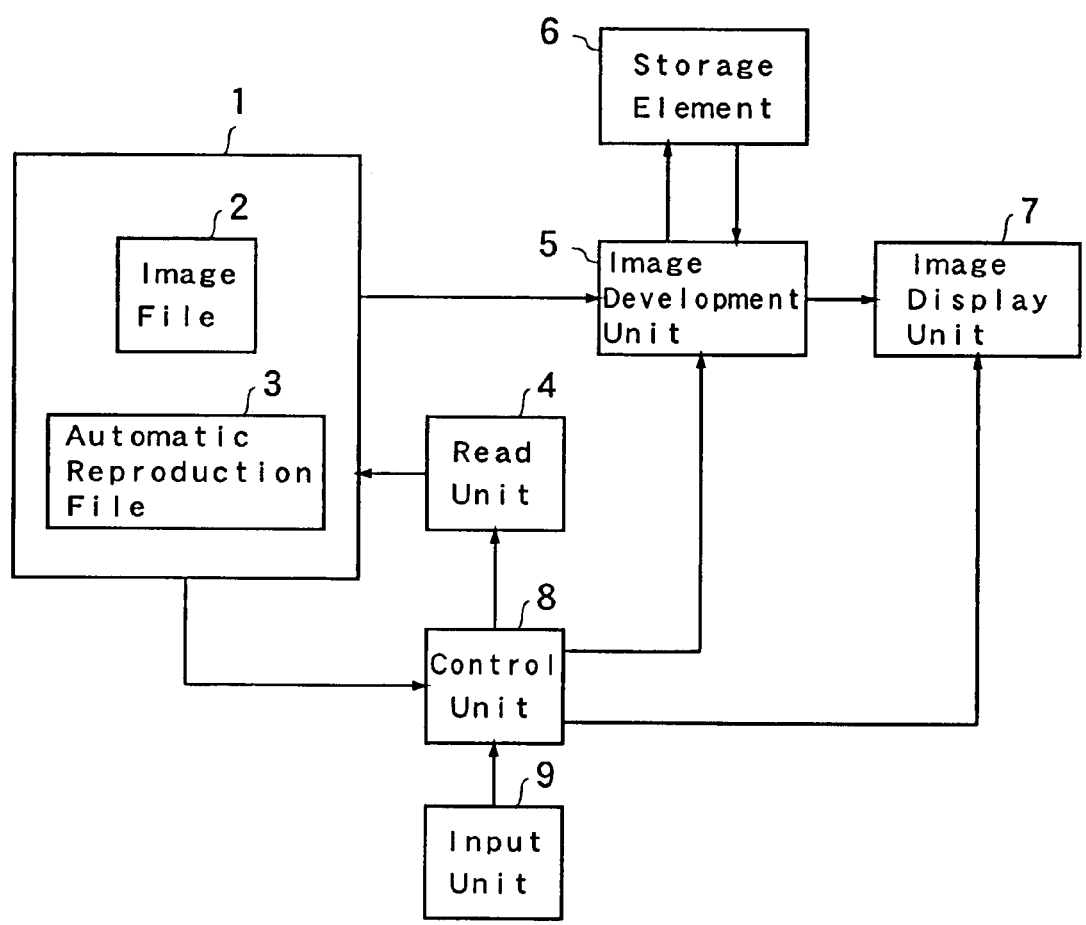
FIG. 4 is a block diagram showing a configuration of an image reproduction device according to a first embodiment of the invention.

FIG. 4 is a block diagram showing a configuration of an image reproduction device according to the invention. In FIG. 4, an image file storage medium 1 is a replaceable medium such as a CF card or an SD card. The image file storage medium 1 has stored therein at least an image file 2 picked up by a digital camera or the like and an automatic reproduction file 3. A read unit 4 is for reading each of the image file 2 and the automatic reproduction file 3 in the image file storage medium 1, and an image development unit 5 is for developing the image file 2. A storage element 6 is for temporarily holding image data developed by the image development unit 5, and an image display unit 7 displays the image data developed by the image development unit 5 on an arbitrary display. A control unit 8 controls each circuit block, and an input unit 9 is operated by a user to give an instruction to execute various menu items of this image reproduction device from outside. An example of the input unit 9 is a button or a switch unit mounted on the image reproduction device or an infrared light remote controller and a USB device such as a USB mouse.

Figure 1:
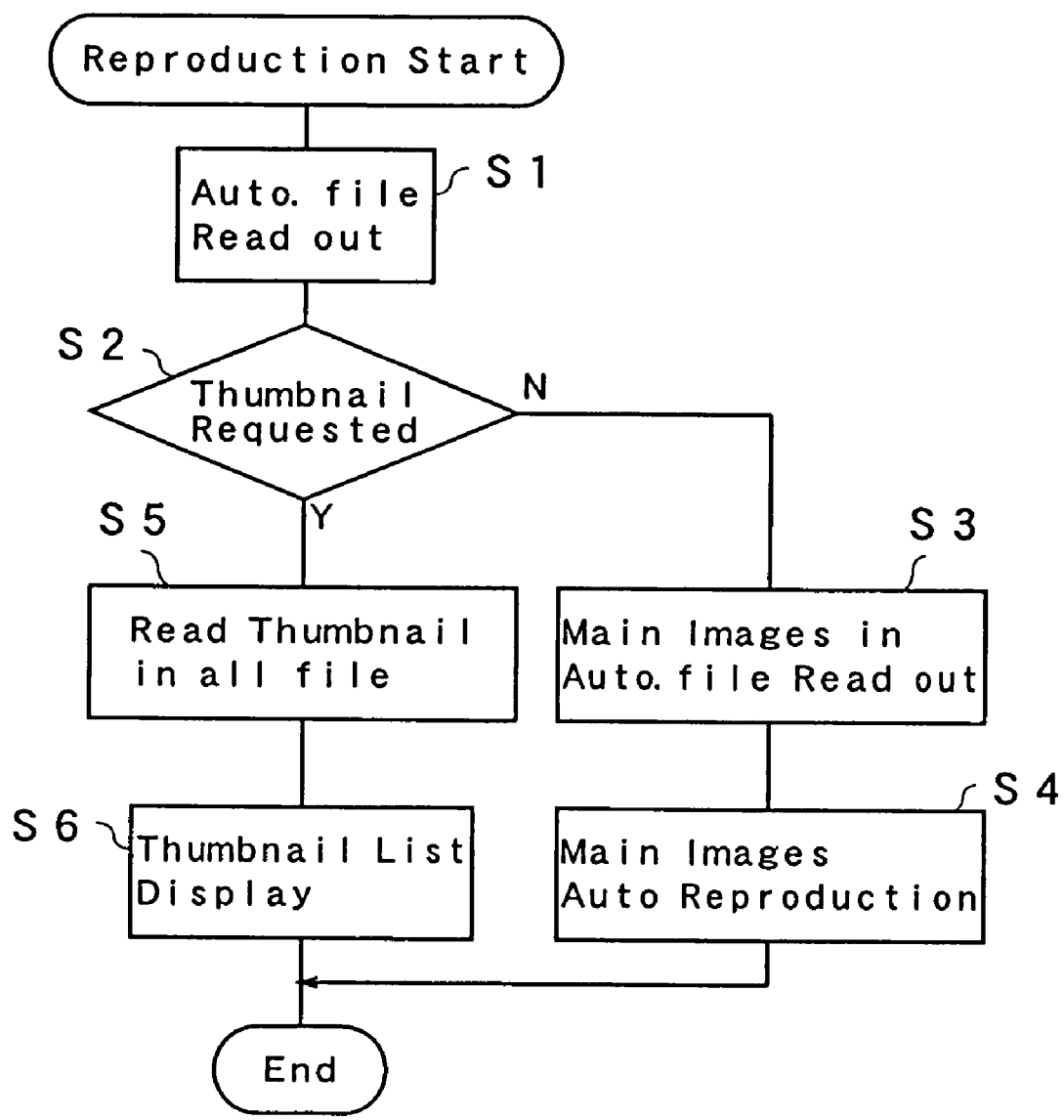
FIG. 1 is a flowchart showing an operation of a conventional image reproduction device.
Figure 2:
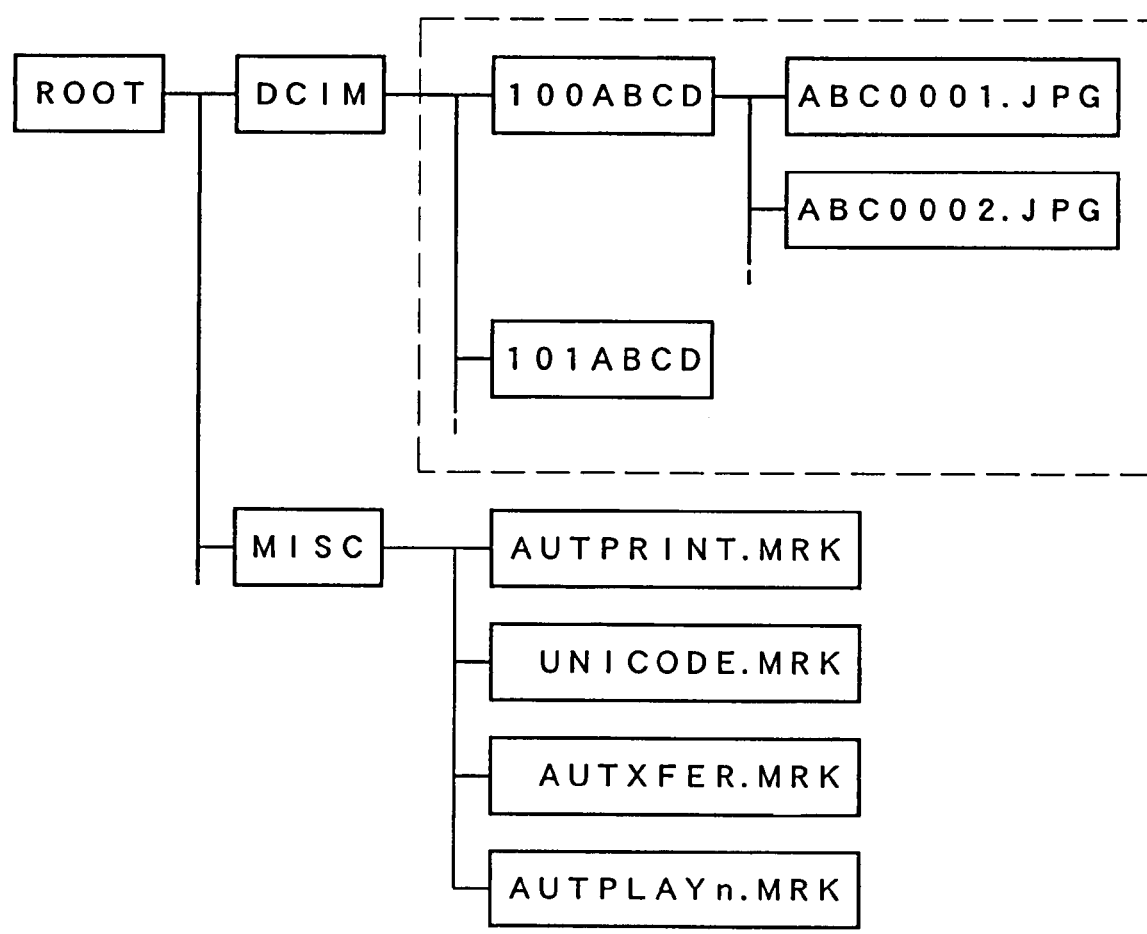
FIG. 2 is a diagram showing an example of an image file structure stored in an image file storage medium.

FIG. 2 shows an example of a file configuration of the image file storage medium 1. FIG. 2 is an image file configuration based on DPOF specifications providing a uniform format for outputting an image picked up by a digital camera. The file configuration in the image file storage medium is roughly divided into a DCIM folder for storing an ordinary image file under a ROOT directory and a MISC folder for storing control information such as automatic reproduction file information. The ordinary image files including ABC0001.JPG, ABC0002.JPG and the like are all placed in the lowest layer of the DCIM folder. Control information for controlling automatic reproduction of these image files are stored in an AUTPLAYn.MRK file under the MISC folder. The information such as designation of the image files automatically reproduced, order in which they are reproduced and image feed time interval are written in the AUTPLAYn.MRK file. In a case where 10 image files including ABC0001.JPG to ABC0010.JPG are located in the lowest layer of the DCIM folder and three images including ABC0002.JPG, ABC0005.JPG and ABC0009.JPG are designated as automatic reproduction files, for example, the image reproduction device automatically displays image data of only the aforementioned three image files sequentially on a display, but does not display the image data of the other seven image files.

Figure 3:
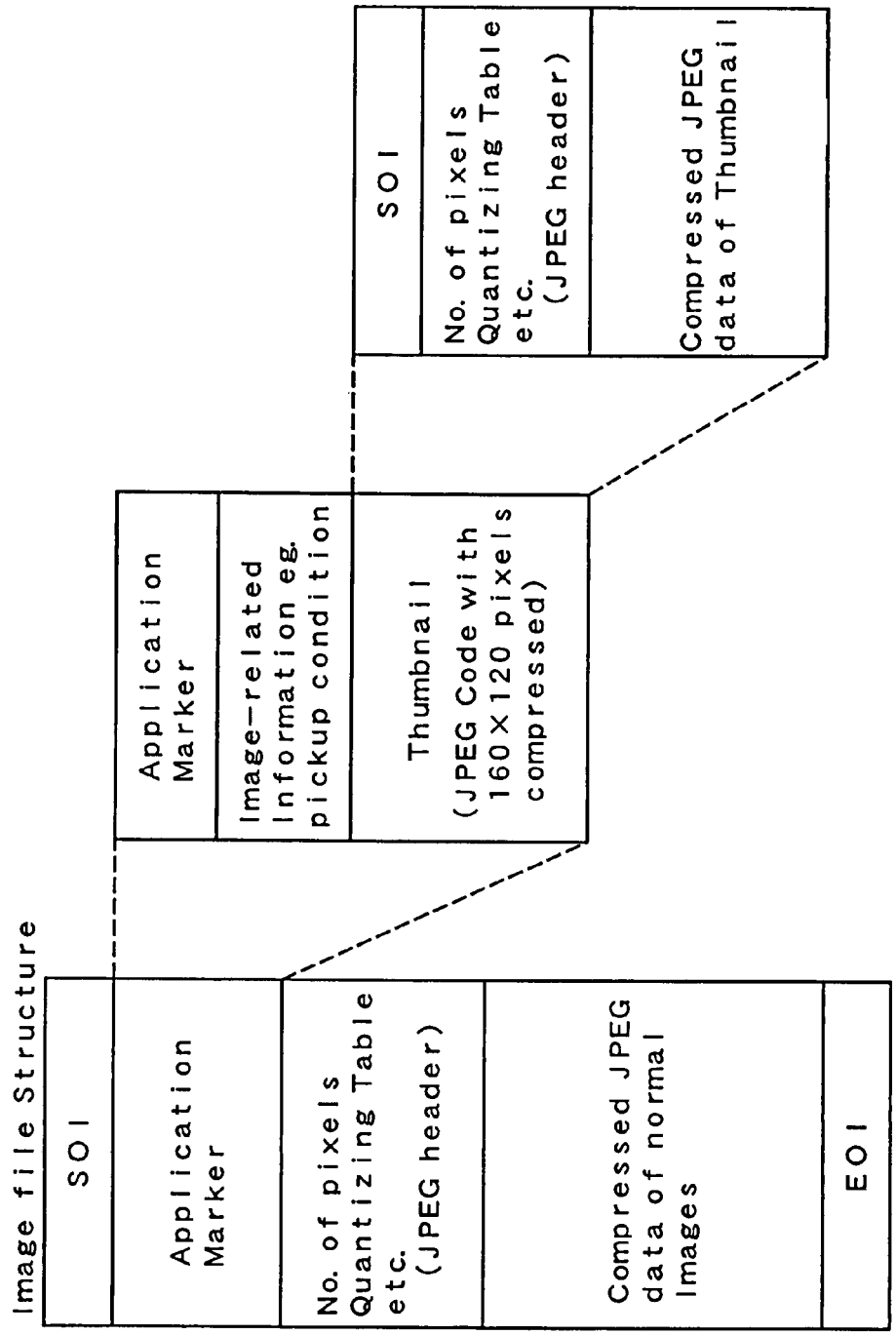
FIG. 3 is a diagram showing an example of the image file structure.

Also, the image reproduction device can display image data of 160×120 pixels normally called a thumbnail as a list. FIG. 3 shows an example of a configuration of the image file 2. Generally, the image file 2 picked up by a digital camera and compressed by JPEG scheme has stored therein thumbnail images together with image-related information such as imaging conditions in an application marker block in addition to JPEG-compressed data of a main image. The image reproduction device, in response to a thumbnail display request, causes the control unit 8 to retrieve a thumbnail image block in each image file in the lowest layer of the DCIM folder of the image file storage medium 1 through the read unit 4, and displays a plurality of thumbnail images on an arbitrary display from the image display unit 7.

Figure 5:
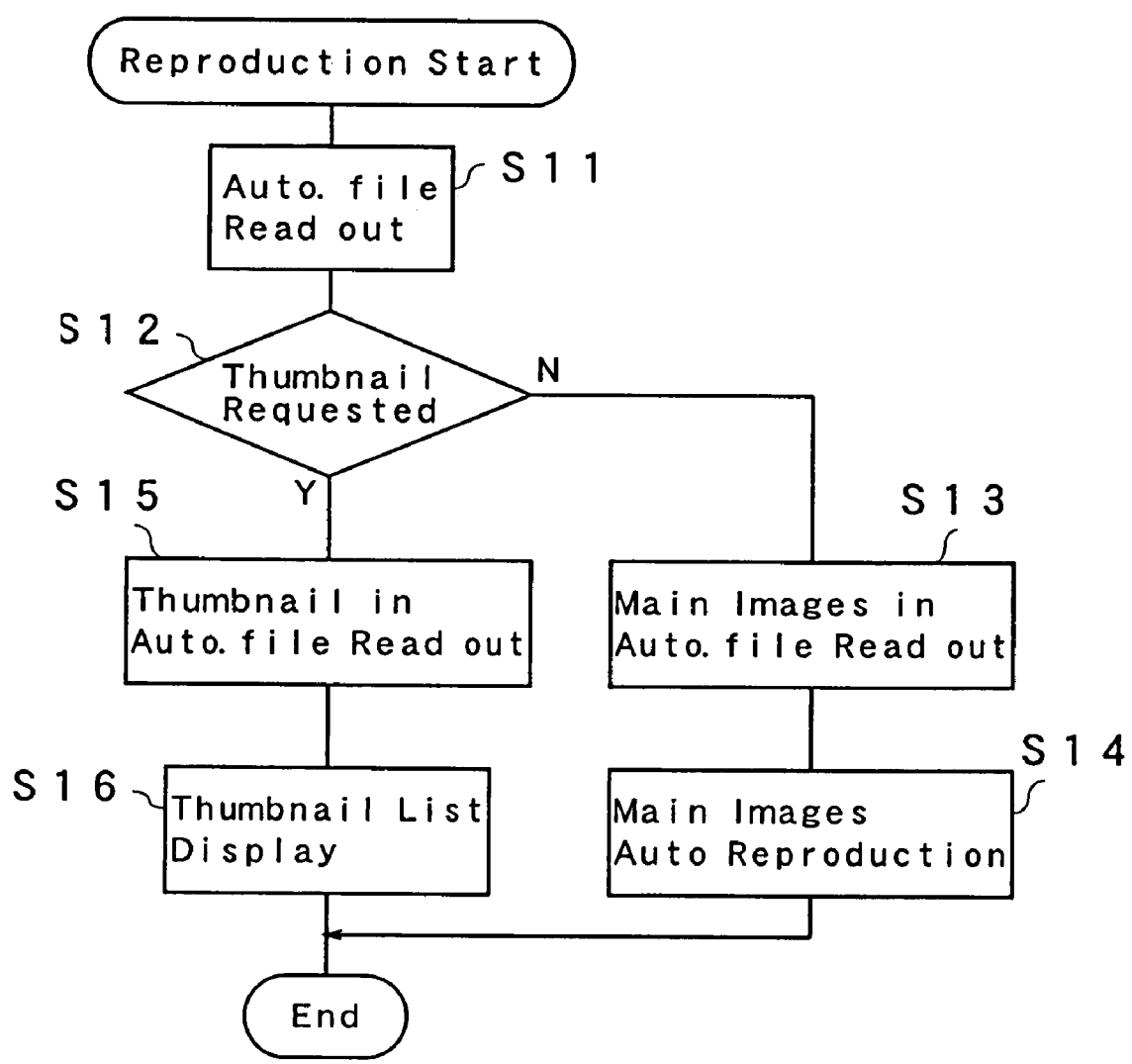
FIG. 5 is a flowchart showing an operation of the image reproduction device according to the first embodiment of the invention.

FIG. 5 is a flowchart showing an operation performed in a case where the image file storage medium 1 stored in the aforementioned format is inserted into this image reproduction device and thumbnail image display is requested by an arbitrary input unit 9. First, in step S11, the control unit 8 controls the read unit 4 for reading contents of the file stored in the image file storage medium 1, and reads an automatic reproduction file of the image file storage medium 1. In step S12, the control unit 8 checks whether a thumbnail display request is received from the input unit 9 or not. In the absence of the thumbnail display request, a main image designated in the automatic reproduction file is retrieved in steps S13, S14 and the main image thereof is automatically reproduced.

In the presence of the thumbnail display request, on the other hand, the process proceeds from steps S12 to S15. In step S15, the control unit 8 reads contents of the automatic reproduction file 3, and only the thumbnail image of the image file described in the automatic reproduction file 3 is read into the image development unit 5 from the image file storage medium 1. In the case under consideration, the image development unit 5, under control of the control unit 8, expands JPEG-compressed image data according to JPEG scheme for display on the image display unit 7 and develops them in the storage element 6. The control unit 8 reads the image data developed in the storage element 6 from the image development unit 5, transfers the image data to the image display unit 7, and displays a list of thumbnails on an arbitrary display in step S16.

Figures 6, 7:
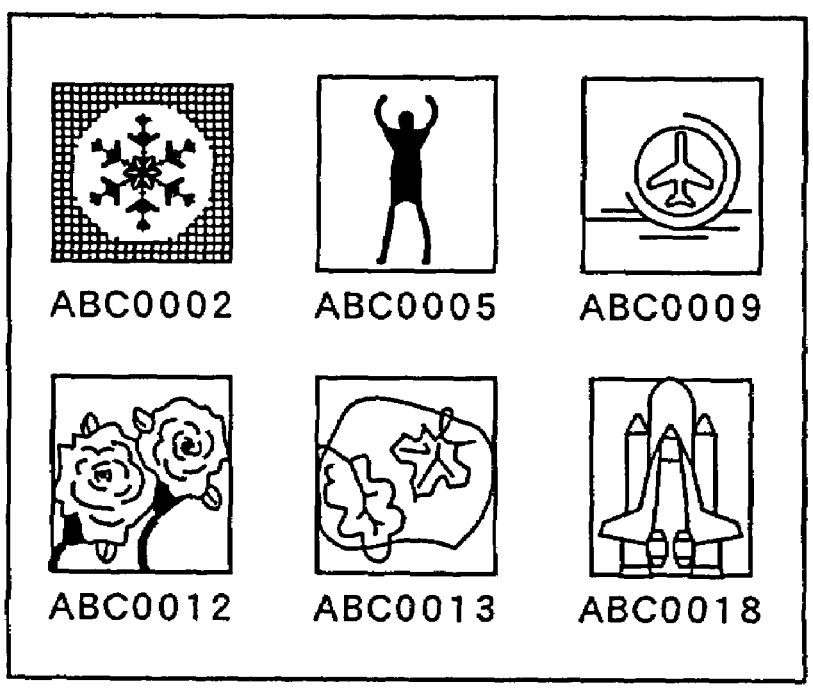
FIG. 6 is a diagram showing a thumbnail image developed in a storage element 6 of the image reproduction device according to the first embodiment.
FIG. 7 is a diagram showing an example of display on the image reproduction device according to the first embodiment.

Assume, for example, that as in the aforementioned case, 20 image files including ABC0001.JPG to ABC0020.JPG are located in the lowest layer of DCIM and six images including ABC0002.JPG, ABC0005.JPG, ABC0009.JPG and the like are designated as automatic reproduction files. The control unit 8 first controls the read unit 4 to read the thumbnail image corresponding to ABC0002.JPG from the image file storage medium 1 into the image development unit 5. Next, ABC0005.JPG file is read following a similar procedure, so that a thumbnail images stored in ABC0005.JPG are developed. FIG. 6 shows contents of the storage element 6 developed in this way. The images thus developed are displayed on a display as shown in FIG. 7.

As described above, with the configuration according to this embodiment, information in the automatic reproduction file 3 are read from the control unit 8 also at the time of thumbnail image display, so that only the thumbnail images in the image file which contains the description of automatic reproduction in the automatic reproduction file 3 in the image file storage medium 1 are displayed on the display. As a result, an image file, which contains the description of non-automatic reproduction in the automatic reproduction file 3 in line with the desire of an owner of the image file storage medium 1 not to display the information to third-party other viewers, can be prevented from being displayed on the display of the image reproduction device at the time of thumbnail image display as well as at the time of automatic reproduction of a main image. This invention is useful especially in a presentation held using a large-screen display such as a projector which a multiplicity of unspecified viewers can view at the same time.

Next, a modification of this embodiment is explained. a presentation using a projector may be carried out in a meeting about a project. In such a case, all participants in the meeting may discuss the information including the contents of the image data of the image file which contains the description of non-automatic reproduction in the automatic reproduction file 3. In such a case, it is bothersome to alter the contents of the automatic reproduction file 3 in the image file storage medium 1 each time. Also, if a job of restoring the original state is forgotten after alteration, it becomes a problem that the image data of the image file which contains the description of non-automatic reproduction is also undesirably displayed on the display at the time of reproduction of the image file storage medium in other equipment compatible with the automatic reproduction function.

Figure 8:
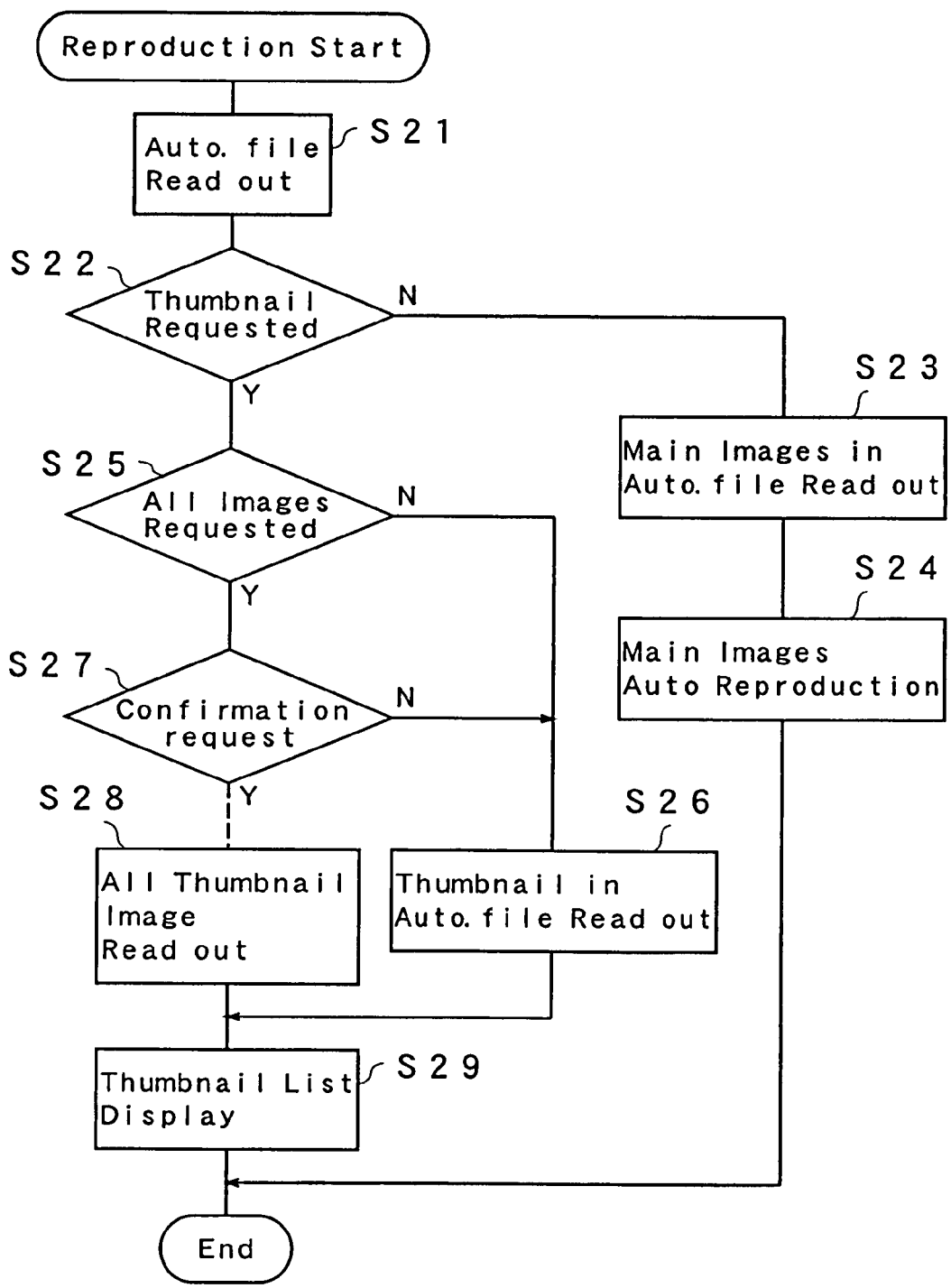
FIG. 8 is a flowchart showing an operation of the image reproduction device according to a modification of the first embodiment of the invention.

The flowchart of FIG. 8 is intended to obviate this disadvantage. Steps S21 to S24 coincide with steps S11 to S14 of the first embodiment. In response to a thumbnail display request, step S25 checks whether the display request covers all the images. In the absence of the request, only the thumbnail designated in the automatic reproduction file is retrieved as in the aforementioned case in step S26. In the presence of a display request for all the images, on the other hand, a menu screen as to whether the thumbnail images of all the image files are displayed or not is displayed in step S27 so that the confirmation whether the thumbnail images of all the image files are displayed or not is allowed to be input by way of the input unit 9. Once this is confirmed, the thumbnails in all the image files are retrieved in step S28. Then, the process proceeds to step 29 to display a thumbnail list. With this operation, the user of the image reproduction device can selectively determine whether the thumbnail images are displayed in accordance with the contents described in the automatic reproduction file 3 in the image file storage medium 1 or the thumbnail images of all the image files in the image file storage medium are displayed. Also, when displaying the thumbnail images of all the image files contained in the image file storage medium 1, the image data of the image file, of which the description by the owner of the image file storage medium to the effect that the display unit also displays the automatic reproduction file 3 which contains the description of non-automatic reproduction. As shown in step S27 of this embodiment, therefore, the confirmation is preferably requested. In this way, security can be strengthened to the benefit of the owner of the image file storage medium 1.

Second Embodiment

Figure 9:
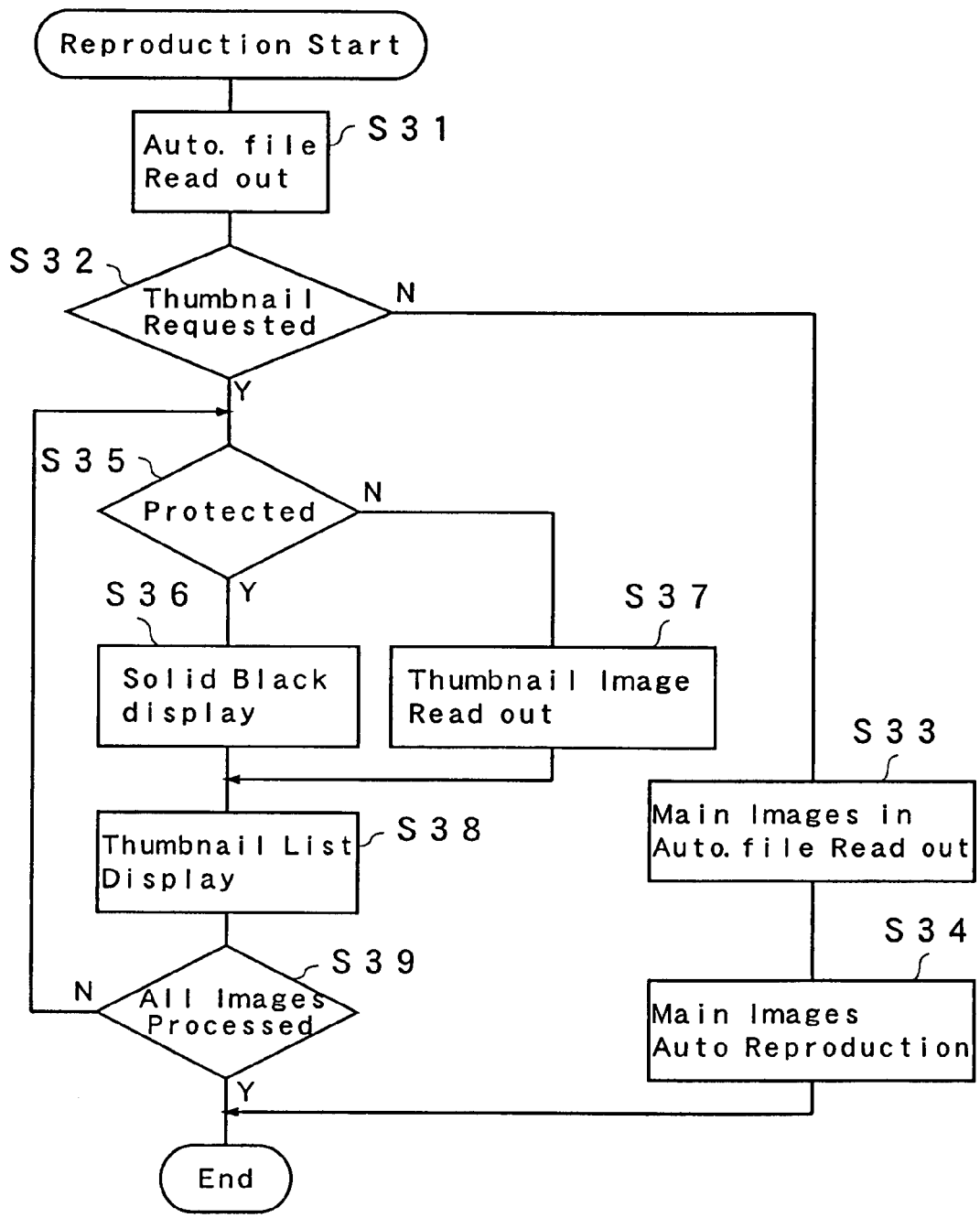
FIG. 9 is a flowchart showing an operation of an image reproduction device according to a second embodiment of the invention.
Figure 10:
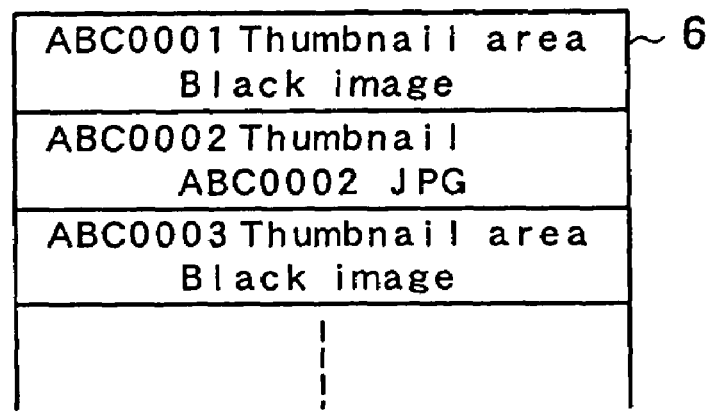
FIG. 10 is a diagram showing an example of image development of a storage element 6 of the image reproduction device according to the second embodiment.
Figure 11:
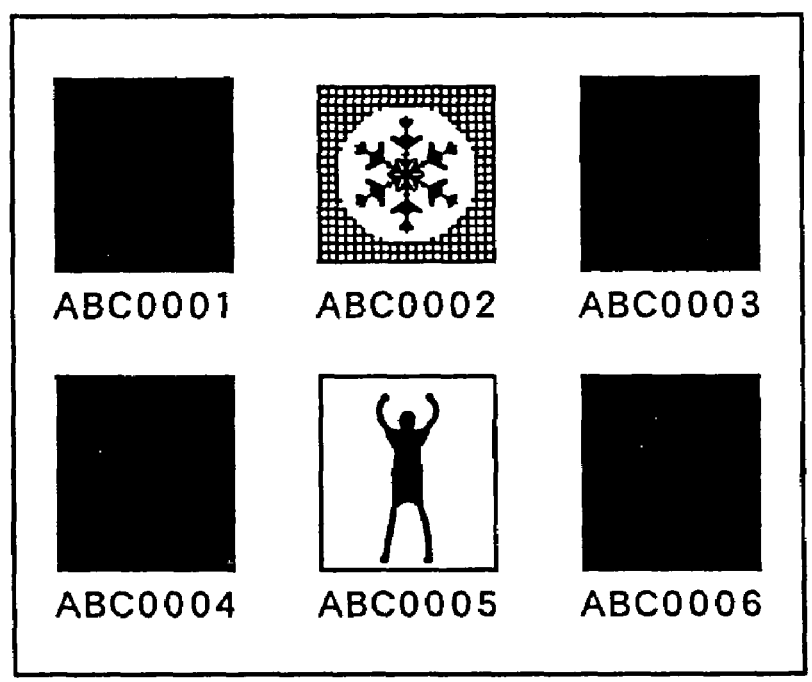
FIG. 11 is a diagram showing an example of display on the image reproduction device according to the second embodiment of the invention.

Next, a second embodiment of the invention is explained with reference to FIGS. 9 to 11.

In the configuration of the first embodiment, assume that the thumbnail image is displayed on the basis of the information described in the automatic reproduction file 3 stored in the image file storage medium 1. Even the presence or absence of the thumbnail image of the image file which contains the description of automatic reproduction in the automatic reproduction file 3, as shown in FIG. 7, is not known to the viewers. In this case, the intention not to display the image data of the image file which it is not desired to disclose to the third-party viewers is achieved. Nevertheless, what kind of other image files exist in the image file storage medium 1 becomes also unknown to the user of the image reproduction device. This inconvenience could be avoided if a list of all the image files stored in the image file storage medium 1 is memorized by the user of the image reproduction device. With the recent marked increase in storage capacity of the image file storage medium 1, however, the number of image files that can be stored in the image file storage medium 1 has increased to several hundreds or more, and the user may be unable to memorize the contents of the image data of all the image files.

In view of this, according to this embodiment, the information in the automatic reproduction file 3 stored in the image file storage medium 1 are read, whether automatic reproduction is permitted or not is judged for each set of a plurality of image files, and the thumbnail image of the image files which contains the description of permitting automatic reproduction is displayed as a dummy thumbnail.

The configuration of the image reproduction device according to this embodiment is the same as that shown in FIG. 2 and therefore will not be shown. FIG. 9 is a flowchart showing a reproduction method for an image reproduction device according to this embodiment. FIG. 11 shows an example of display of a thumbnail image according to this embodiment.

Next, an operation is explained with reference to a flowchart.

In a case where the image file storage medium 1 is inserted into this image reproduction device and a thumbnail image display request is issued from the input unit 9, the control unit 8 controls the read unit 4 to read file contents of the image file storage medium 1 thereby to read the file of the image file storage medium 1. Steps S31 to S34 are the same as steps S11 to S14 of the first embodiment. Assume that a thumbnail display request is issued. In a case where the image file storage medium 1 contains the automatic reproduction file 3 in step S32, the control unit 8 reads the contents of the automatic reproduction file 3, thereby judging whether the thumbnail is protected or not, i.e., whether the thumbnail is intended for automatic reproduction or not. In a case where the thumbnail is not intended for automatic reproduction, the process proceeds to step S36, and the dummy thumbnail image data such as all-zero data (i.e., solid black) are written in the area of the storage element 6 which originally should store the thumbnail image data of the ABC0001 file, through the image development unit 5 as shown in FIG. 10.

According to this embodiment, the dummy thumbnail image data are written in the storage element 6 through the image development unit 5. It is possible, however, to write the dummy thumbnail image data from the control unit 8 directly into the storage element 6. Also, according to this embodiment, all-zero data (solid black) are written in the storage element 6. Nevertheless, an arbitrary image data other than the solid black, such as a logo of a maker, may be held in the storage element 6 and written in the thumbnail area of the storage element 6 with equal effect. With this operation, the display quality can be improved. In a case where the thumbnail is not protected, i.e., in a case where the thumbnail is intended for automatic reproduction, on the other hand, the image of the thumbnail is read and developed in step S37. A list of thumbnails is displayed in step S38 thereby to judge whether all the images have been completely processed or not. In a case where all the images have not been completely processed, the process returns to step S35 and a similar process is repeated.

Assume, for example, that 20 image files ABC0001.JPG to ABC0020.JPG are located in the lowest layer of DCIM and six images including ABC0002.JPG, ABC0005.JPG, ABC0009.JPG, ABC0012.JPG, ABC0013.JPG and ABC0019.JPG are designated as automatic reproduction files. In step S35, the control unit 8 judges that ABC0001.JPG is not included in the automatic reproduction files, based on the information described in the automatic reproduction files 3. Thus, the corresponding thumbnail area is blackened as shown in FIGS. 10 and 11.

Next, the thumbnail of the image file ABC0002.JPG is displayed. The automatic reproduction file contains the description of the automatic reproduction of the ABC0002 file. In step S37, the control unit 8 performs the control operation in such a manner as to read the thumbnail image of the image file ABC0002 into the image development unit 5 from the image file storage medium 1. In this case, the image development unit 5, under the control of the control unit 8, extends a JPEG-compressed image file to a size capable of being displayed as an image on the image display unit 7 and develops it in the storage element 6. The image data developed in the storage element 6 is read from the image development unit 5, transferred to the image display unit 7 and displayed on the display unit of the image reproduction device. Subsequently, the image display process is executed in similar steps for ABC0003, ABC0004 and so forth, in that order. In this way, the process returns from step S39 to step S35 to execute a similar process until all the thumbnail images are processed completely. With this operation, the thumbnail image list shown in FIG. 11 can be displayed on the display unit.

As a result, the user of this image reproduction device can display a list of all the image files stored in the image file storage medium 1 using the thumbnail image display function of this image reproduction device. In the process, the thumbnail image of the image file which the owner of the storage medium 1 (normally, the same as the user of this image reproduction device) does not want to display to the third-party viewers is displayed in the solid black or like dummy thumbnail image, results in protection. In many cases, the user displays thumbnail images for the purpose of searching the image file in the storage medium 1. In a case where the thumbnail images of the image file, which contains the description of non-automatic reproduction in the automatic reproduction file 3 of the image file storage medium 1, are unified by an arbitrary image data as in this embodiment, therefore, a file name attached to each image file is required to be designed to facilitate judgment on a part of the user of this image reproduction device as to which image file corresponds to what image data. As a result, the user of this image reproduction device can easily judge from the image file name what kind of image file is stored in the image file storage medium, and therefore the main image of the corresponding image file can be displayed.

Figure 12:
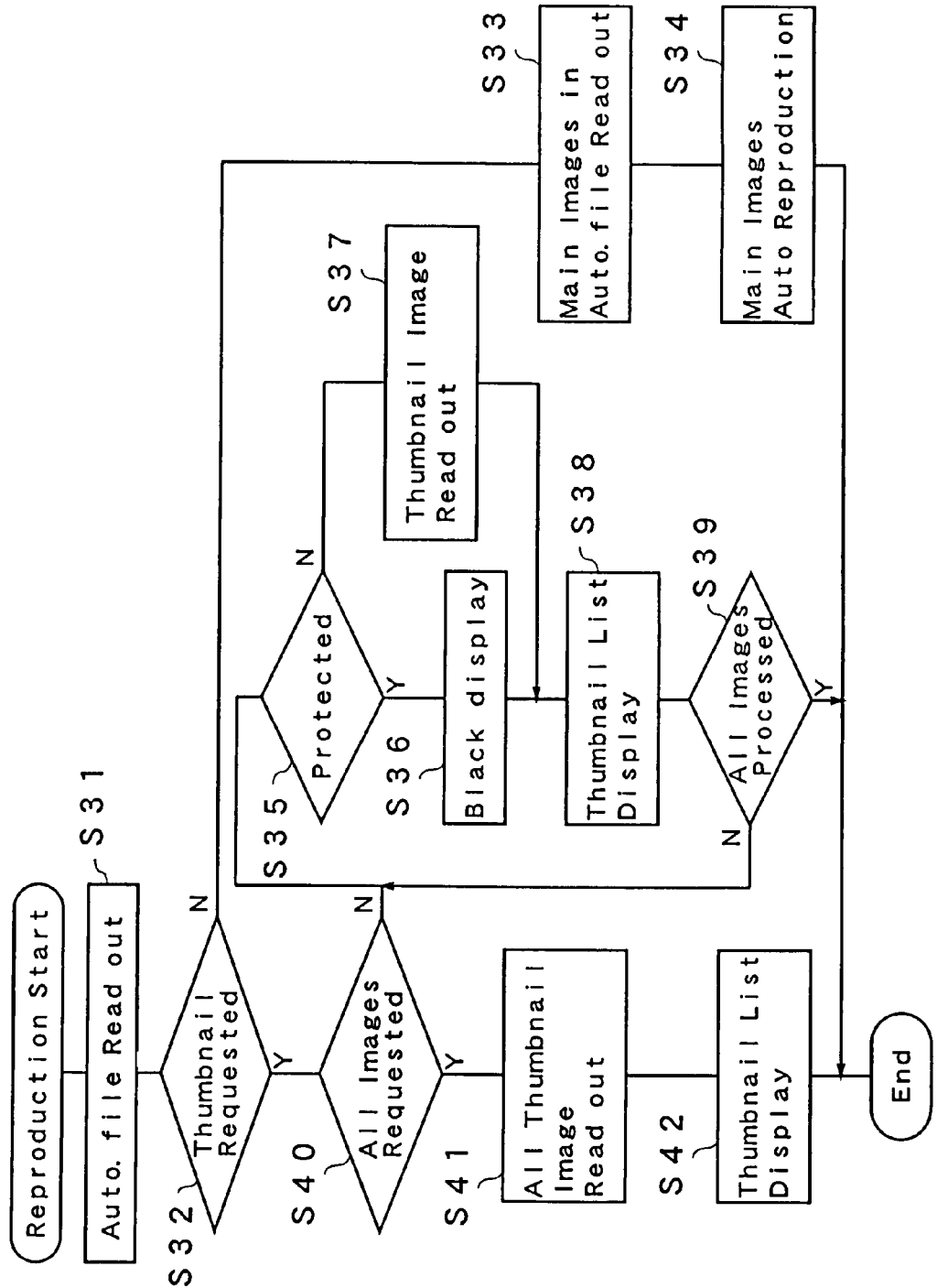
FIG. 12 is a flowchart showing an operation of a modification of the second embodiment of the invention.

Next, a modification of this embodiment is explained. The user may desire to display a thumbnail image, irrespective of the description of non-automatic reproduction in the automatic reproduction file 3 stored in the image file storage medium 1. An operation for such a case is explained with reference to a flowchart of FIG. 12. Operations of steps S31 to S39 are similar to those described above. According to this embodiment, step S32 checks whether a request to display all the images is issued or not after the thumbnail display request (step S40). In the absence of a request to display all the images, an operation similar to the above-mentioned case is performed. In the presence of a request to display all the images, on the other hand, the process proceeds to step S41 to retrieve the thumbnail images of all the image files from the image file storage medium 1. Then, step S42 displays a thumbnail list. At the same time, as shown in step S27 of FIG. 8, assuming that a request to display the thumbnail image is inputted through the input unit 9 to this image reproduction device, this image reproduction device may display a menu screen to check whether the thumbnail images of all the image files are to be displayed or not, and confirmation is input from the input unit 9. With this operation, the user of the image reproduction device can selectively determine whether the thumbnail images are displayed in accordance with the contents described in the automatic reproduction file 3 or the all thumbnail images of all the image files in the image file storage medium are displayed.

As described above, with the configuration according to this invention, also at the time of displaying the thumbnail image, the image data which the owner of the image file storage medium 1 does not want to be displayed to the third-party viewers can be prevented from being displayed, by reading the information of the automatic reproduction file 3 by way of the control unit 8. Also, by using a dummy image data in place of the thumbnail image of the image file which contains the description of non-automatic reproduction in the automatic reproduction file 3, the user of this image reproduction device can search the desired image file using the thumbnail display function.

Third Embodiment

Next, a third embodiment of the invention is explained with reference to FIGS. 13 to 18.

In the configuration according to the second embodiment, the thumbnail images of all the image files with the description of non-automatic reproduction in the automatic reproduction file 3 are displayed on the display unit uniformly as a solid-black or an arbitrary image data. Therefore, the user of this image reproduction device encounters a problem that it is hard to remind which image file contains what image data. In a case of an image file picked up by a digital camera, the camera often automatically gives image file names simply in chronological order of an image pickup operation. For the purpose of easy recognition of contents of image data of a particular image file, therefore, the file name of the image file is required to set in advance so that the user of this image reproduction device can intuitively understand the contents of the image data. Depending on a manner in which a name is attached to the image file, however, a third party may speculate about the contents of the thumbnail image displayed in solid black or arbitrary image data.

In view of this, this embodiment enables to display the thumbnail image of the image file with the description of non-automatic reproduction in the automatic reproduction file 3 on the display unit of the image reproduction device in such a manner as not to be easily recognized by the third party.

Figure 13:
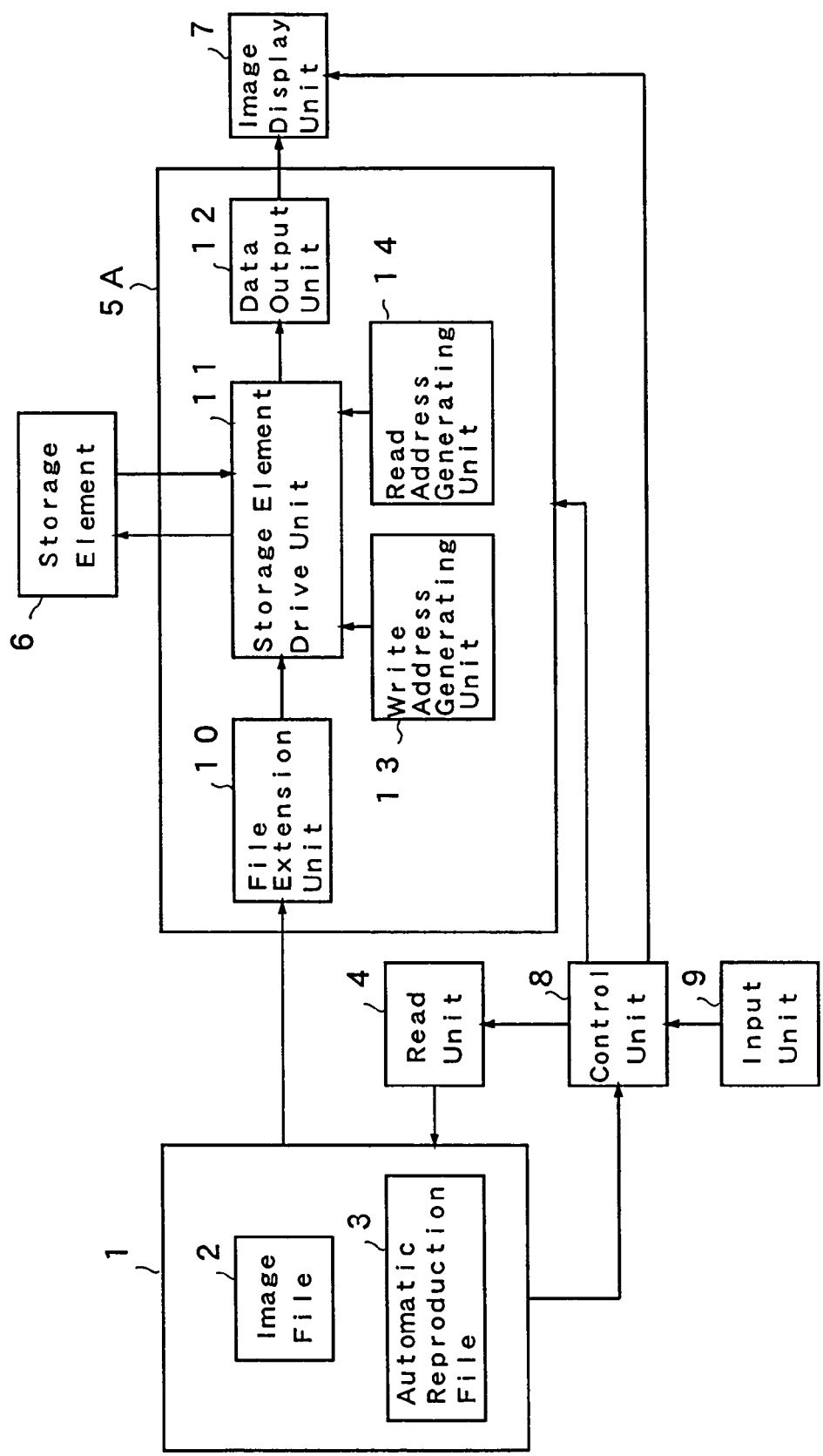
FIG. 13 is a block diagram showing a configuration of an image reproduction device according to a third embodiment of the invention.

FIG. 13 is a block diagram showing a configuration according to this embodiment, in which the same component parts as in FIG. 4 are designated by the same reference numerals, respectively, and not described in detail. This embodiment has a feature in an image development unit 5A. In the image development unit 5A shown in FIG. 13, a file extension unit 10 is for extending an arbitrary image file 2 stored in the image file storage medium 1. A storage element drive unit 11 reads and writes image data from and into the storage element 6. A data output unit 12 is for outputting the image data written in the storage element 6 to the image display unit 7. A write address generating unit 13 is for generating a write address required for the storage element drive unit 11 to write the image data in the storage element 6. A read address generating unit 14, on the other hand, is for generating a read address required for the storage element drive unit 11 to read the image data stored in the storage element 6. The configuration of the other component parts is the same as the corresponding configuration in the embodiments described above.

Figure 14:
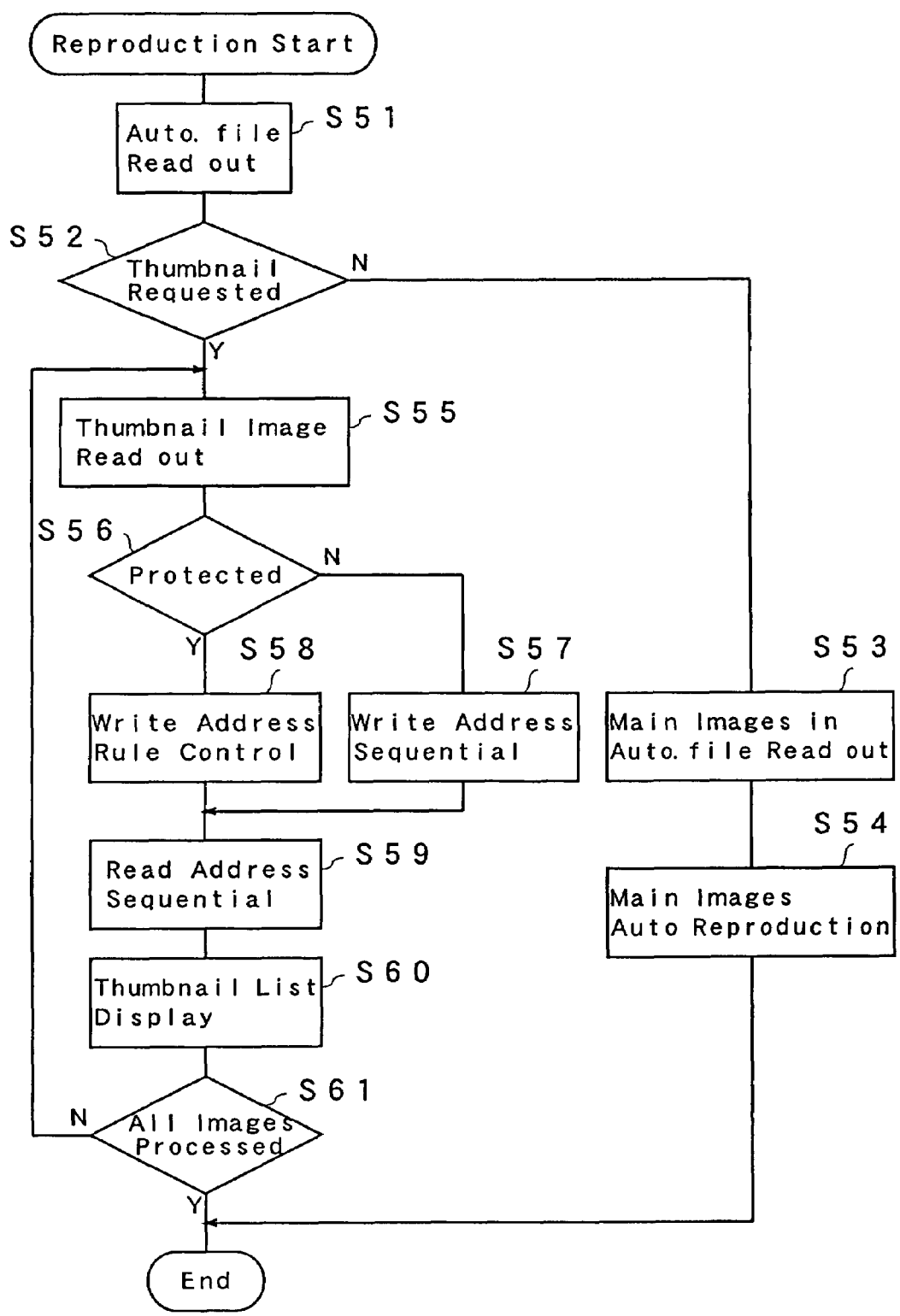
FIG. 14 is a flowchart showing an operation of the image reproduction device according to the third embodiment.

Next, an operation is explained with reference to the flowchart of FIG. 14. First, upon insertion of the image file storage medium 1 into this image reproduction device, the control unit 8 controls the read unit 4 for reading the contents of the files of the image file storage medium 1 thereby to read the file contents of the image file storage medium 1. In the presence of the automatic reproduction file 3 in the image file storage medium 1, the control unit 8 reads the contents of the automatic reproduction file 3 (step S51). Then, the control unit 8 checks whether the thumbnail image display is requested or not (step S52). In a case where no thumbnail is requested, the process proceeds to steps S53, S54, so that the main image designated by the automatic reproduction file is retrieved and displayed by automatic reproduction.

In a case where the user requests to display a thumbnail, on the other hand, the process proceeds to step S55 in which the thumbnail images are retrieved in a predetermined order. Step S56 judges whether the main image is to be automatically reproduced by the automatic reproduction file, i.e., whether the main image is protected or not. In a case where the automatic reproduction is not involved, the process proceeds to step S57, in which the write addresses for the storage element are sequentially controlled. In a case where the main image is protected, the process proceeds to step S58 in which the write addresses for the storage element are controlled according to a predetermined rule in a discontinuous way. Next, the process proceeds to step S59 for sequentially controlling the read addresses. In this way, the storage element 6 holds the thumbnail images. Then, the process proceeds to step S60 to display a thumbnail list. In a case where all the images are not completely displayed, the process returns to step S55, while all the images are displayed, the process is terminated (step S61).

Figure 15:
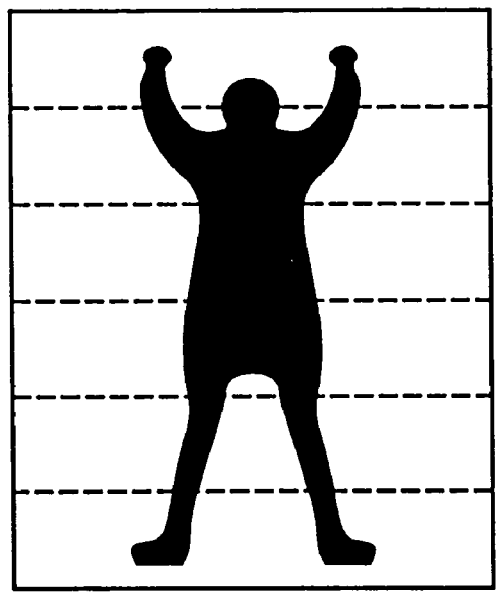
FIG. 15 is a diagram showing normal display of a thumbnail image according to the third embodiment.
Figure 16:
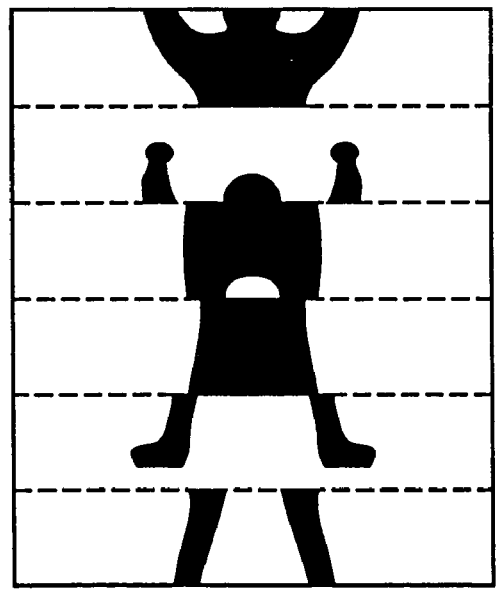
FIG. 16 is a diagram showing a thumbnail image deformed according to a predetermined rule.

Assume, for example, that 10 image files ABC0001.JPG to ABC0010.JPG are located in the lowest layer of DCIM and three images including ABC0002.JPG, ABC0005.JPG and ABC0009.JPG are designated as an automatic reproduction file 3. The control unit 8 first controls the read unit 4 to read the thumbnail image of ABC0001.JPG from the image file storage medium 1 to the file extension unit 10 of the image development unit 5. In this case, the file extension unit 10 extends a JPEG-compressed image file as an image data and outputs it to the storage element drive unit 11. On the other hand, the write address generating unit 13 controls generating operation according to a predetermined rule based on the condition that the file ABC0001 is an image file of which automatic reproduction is not permitted, i.e., the file ABC0001 is protected according to the information of the automatic reproduction file 3 from the control unit 8. Specifically, the write addresses "0000, 0001, 0002, 0003, . . . ", which are normally generated in that order for the write operation into the storage element 6, are changed in order. The read address generating unit 14, on the other hand, sequentially generates the reading addresses for the image data stored in the storage element 6 and sequentially reads the image data stored in the storage element 6. In the case under consideration, unless the image data is much different from an original image, the third party can easily imagine the original image. By changing the image data for each plurality of lines or image blocks, therefore, contents of the image data are prevented from being easily recognized by the third party. For example, the thumbnail image is segmented for each 20 lines. Normally, the thumbnail image is configured of 160 pixels by 120 lines, and therefore can be segmented into 6 (=120/20) blocks. The image data segmented into six blocks in this way are arranged in an arbitrary order. As a result, the thumbnail image is segmented into six parts in horizontal direction and arranged in random order for display. In the case of a thumbnail of an human image as shown in FIG. 15, for example, six blocks of each 20 lines are changed in order. Then, the image shown in FIG. 16 is obtained. In this way, a thumbnail list is displayed.

The foregoing explanation of the operation refers to the case where the thumbnail image is segmented by line to facilitate the address management of the storage element 6. Nevertheless, a similar effect can of course be secured by segmenting the image data by pixel in a vertical direction. As another alternative, the thumbnail image can be segmented both vertically and horizontally and combined with equal effect.

The greater the number of divisions into which the thumbnail image is segmented, the advantage is greater that the contents of the original image is hard to understand to the third party. An excessively greater number of divisions of the thumbnail image, however, leads to the disadvantage that it becomes difficult even for the user of the image reproduction device to understand the contents of the image data. In view of this, the image reproduction device may be so constructed that the user thereof can select the number of divisions of the thumbnail images by way of the input unit 9. With this operation, the thumbnail image more suitable to the operating conditions of the image reproduction device can be displayed. As an example, an infrared light remote controller is used as the input unit 9, so that the control data issued from the infrared light remote controller is received by the control unit 8 and a menu screen is displayed with an arbitrary OSD on the display unit of the image reproduction device. The user of the image reproduction device can thus set the number of divisions of the thumbnail image by selecting each item of the OSD menu with the infrared light mouse.

In the aforementioned case, the write addresses to the storage element 6 are generated in the order under a predetermined rule to deform the thumbnail image. As an alternative, the write addresses may be sequentially generated from the write address generating unit 13 and the image data written in the storage element 6, while the read addresses for the storage element 6 which are generated from the read address generating unit 14 may be controlled in accordance with a predetermined rule.

Figure 17:
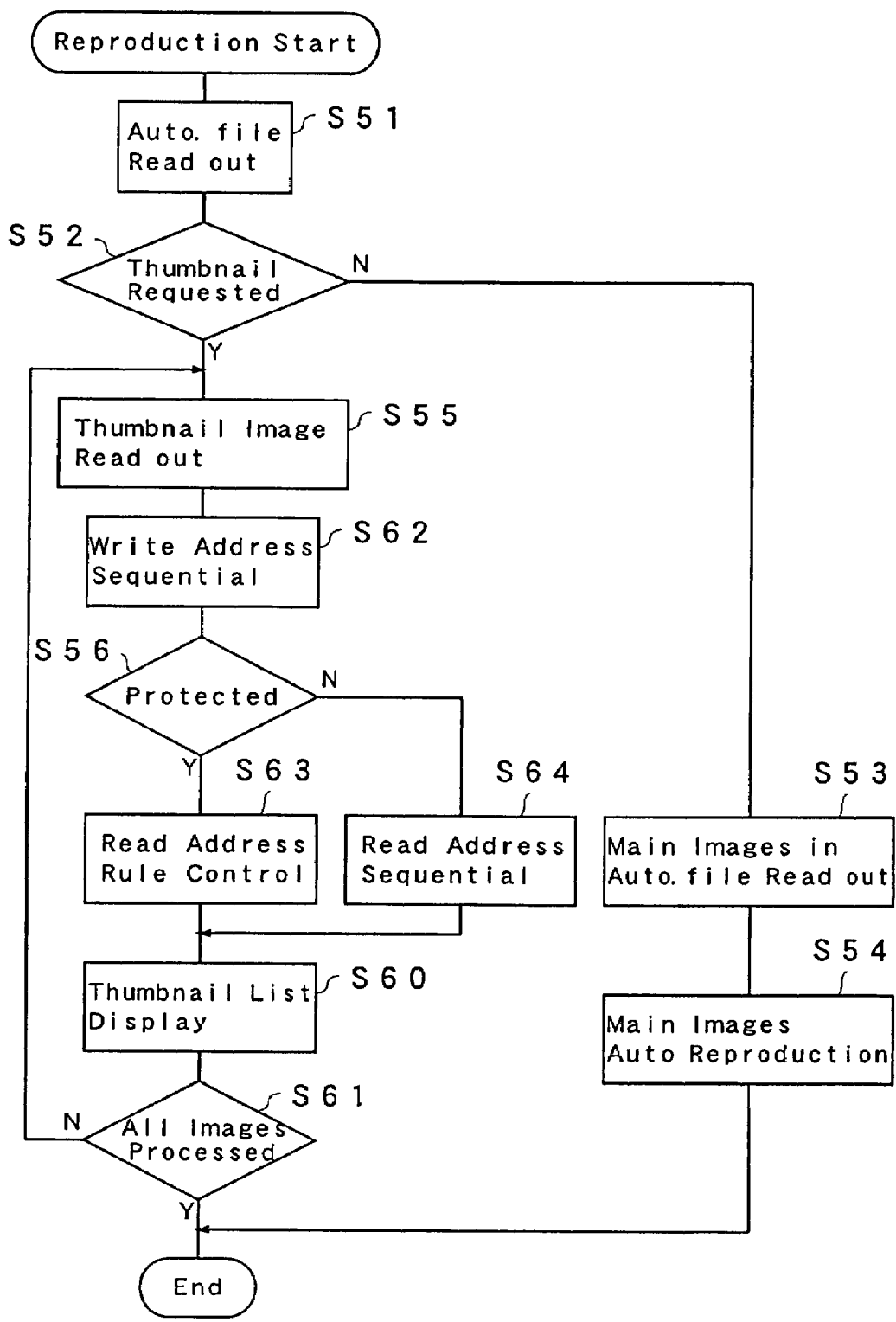
FIG. 17 is a flowchart showing another example of operation according to the third embodiment.

The operation in this case is shown in the flowchart of FIG. 17. After retrieving the thumbnail image in step S55, the process proceeds to step S62 where the write addresses are sequentially controlled and written in the storage element 6. Then, depending on whether the data are protected or not, the operation is switched to generate the read addresses according to a predetermined rule or to sequentially control the read addresses (steps S63, S64). Also in this case, the data of the storage element read by the read addresses are displayed in a thumbnail list (step S60) thereby to judge whether all the images have been processed or not, followed by repeating the process.

Figure 18:
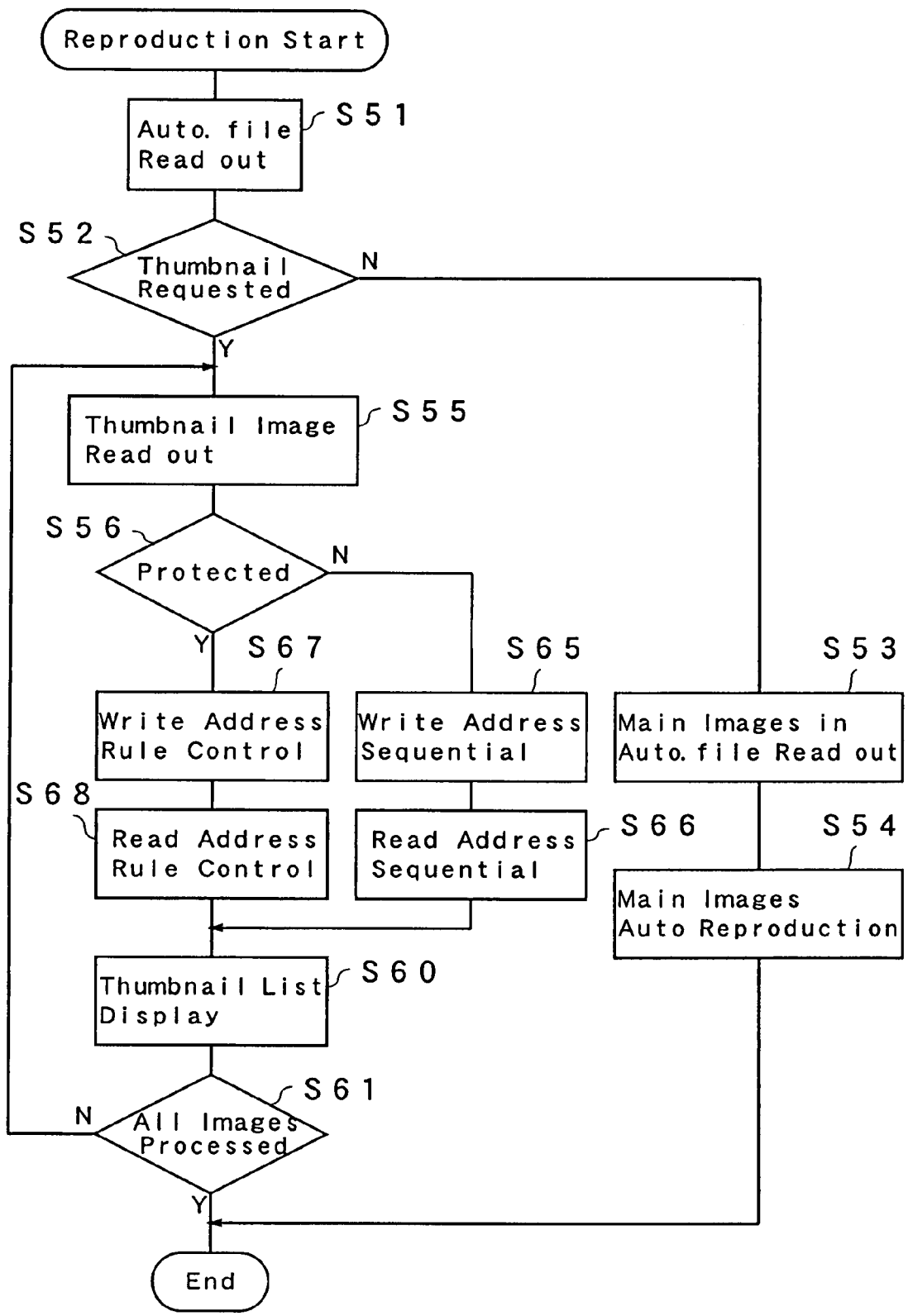
FIG. 18 is a flowchart showing still another example of operation according to the third embodiment.

As another alternative, in a case where the data is not protected as shown in FIG. 18, the write addresses and the read addresses are generated at the same time sequentially (steps S65, S66), while in a case where the data is protected, the operation is switched according to a predetermined rule. Specifically, both the write addresses generated from the write address generating unit 13 and the read addresses generated from the read address generating unit 14 may be changed according to a predetermined rule (steps S67, S68) with similar effect. In this case, however, if a method of generating the read addresses and a method of generating the write addresses are exactly identical to each other, the normal image display would result. Therefore, different rules are required to be employed between the two addressing generating methods.

As a rewrite operation according to a predetermined rule, the image may be shaded with a low-pass filter or changed to a mosaic image. Further, a part of the image may be cut out and displayed in enlarged form, or the most significant bits and the least significant bits may be replaced with each other. In the case of 8-bit image data R0 to R7, for example, R0(LBS) is replaced with R7(MBS) or R1 with R6 and R2 with R5. In this way, the image data are changed according to a predetermined rule into a form which is apparently hard to recognize but a writer of the image data can grasp the contents thereof.

As described above, with the configuration according to this invention, even at the time of displaying the thumbnail image, the image data which the owner of the image file storage medium 1 does not want to display to the other viewers can be easily prevented from being displayed by reading the information of the automatic reproduction file 3 from the control unit 8. Also at the time of displaying the thumbnail, the thumbnail image of the image file with the description of non-automatic reproduction in the automatic reproduction file 3 cannot be recognized apparently by other than the user of the image reproduction device, but can be identified only by the user of the image reproduction device. Even when using a large-screen display such as a projector operated before a multiplicity of unspecified persons, therefore, the user of the image reproduction device can search the image file while protecting the image data of the image file of which disclosure to the third party is not desired, using a list function of the thumbnail image.

Fourth Embodiment

Figure 19:
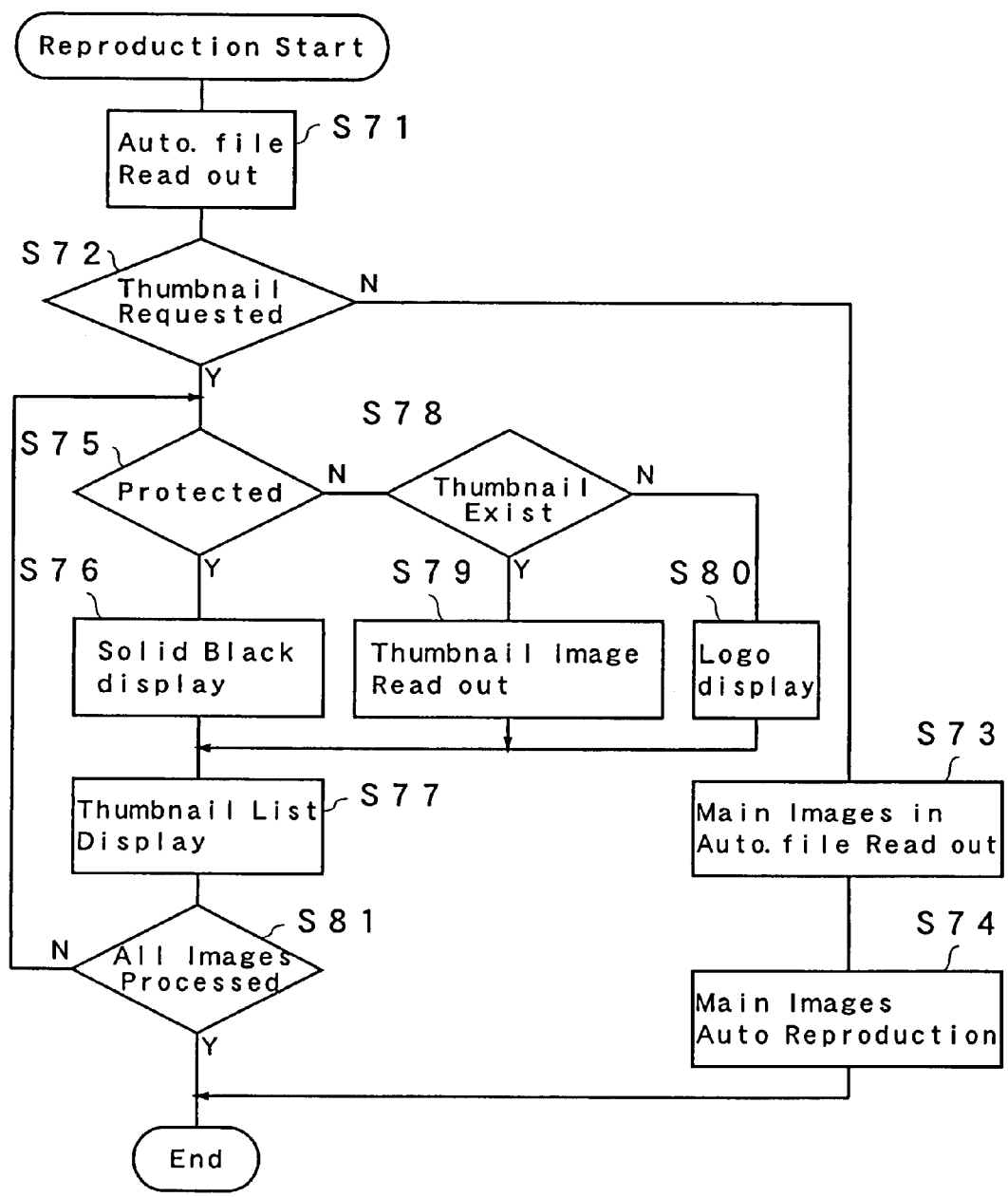
FIG. 19 is a flowchart showing an operation of an image reproduction device according to a fourth embodiment of the invention.

Next, a fourth embodiment of the invention is explained with reference to FIG. 19.

As shown in FIG. 3, when picked up with an ordinary digital camera, both the main image and the thumbnail image are stored in the same image file. Some image file production software used for a personal computer, however, is not intended to produce a thumbnail image in addition to the main image. In a case where the image file storage medium including this kind of image file is used, the thumbnail image, if any, in the image file with the description of automatic reproduction in the automatic reproduction file 3 in the image file storage medium 1 can be displayed without any problem in the configuration of the second and third embodiments. However, the thumbnail image, if not included in the image file, cannot be displayed. In a case where the solid-black image data is displayed in the area where the thumbnail is to be displayed, therefore, it is a problem that even the user cannot make distinction from the image file with the description of non-automatic reproduction in the automatic reproduction file 3.

In the absence of a thumbnail image, the main image may be displayed by being resized to a standard pixel size of 160×120 pixels of the thumbnail image. With this operation, the thumbnail image can be displayed. Nevertheless, a long time of about 30 seconds may be required from the time of resizing to the time of displaying the image. As a result, the user of the image reproduction device is liable to misunderstand that the system has gone out of order or hung up. Also, in a case where the large-screen video display device such as a projector intended for presentation is used as a display for this image reproduction device, the display of the thumbnail image, if carried out by the method described above, would pose the problem that many viewers have to wait about several tens of seconds during the display operation.

This problem is solved in this embodiment by judging whether the thumbnail image of the image file is present or not, and upon receipt of a request to display a thumbnail of the image file lacking the thumbnail image, the image file with the description of non-automatic reproduction in the automatic reproduction file 3 is displayed by a different display method.

a configuration of the image reproduction device according to this embodiment is identical to the configuration shown in FIG. 2, and therefore is not explained any more. The operation is explained with reference to the flowchart of FIG. 19.

First, upon insertion of the image file storage medium 1 into the image reproduction device, the control unit 8 controls the read unit 4 to read contents of the file of the image file storage medium 1 thereby to read the contents of the file of the image file storage medium 1. In a case where the image file storage medium 1 includes an automatic reproduction file 3, the control unit 8 reads the contents of the automatic reproduction file 3 (step S71). Then, the control unit 8 checks whether thumbnail image display is requested or not (step S72). In the absence of the thumbnail request, the process proceeds to steps S73, and S74 in which the main image designated in the automatic reproduction file is retrieved and is displayed by automatic reproduction.

In the presence of the thumbnail display request, on the other hand, the process proceeds to step S75 to retrieve the thumbnail images in a predetermined order. Step S75 judges whether the main image is set for automatic reproduction in the automatic reproduction file or not, i.e., whether the data is protected or not. In a case where the data is protected, the first dummy, e.g., the solid black is displayed in all the thumbnail areas in step S76. Then the process proceeds to step S77 to display a thumbnail list and judge whether all the screens have been completely processed or not (step S81). Unless all the screens are completely processed, the process returns to step S75 to repeat a same process until all the thumbnails are completely processed. Unless the data is protected in step S75, the process proceeds to step S78 to judge whether a thumbnail image is present or not. In the presence of a thumbnail image, the particular thumbnail image is retrieved in step S79. In the absence of a thumbnail image in step S78, on the other hand, a second dummy is displayed. The second dummy image is different from the dummy image used in step S76, and may be a predetermined logo, for example. These data are held in the storage element 6.

Assume, for example, that 10 image files ABC0001.JPG to ABC0010.JPG are located in the lowest layer of DCIM and three images ABC0002.JPG, ABC0005.JPG and ABC0009.JPG are designated as automatic reproduction files 3 and the thumbnail image is not stored in the ABC0005 file. In this case, the control unit 8, based on the information described in the automatic reproduction file 3, is informed that ABC0001.JPG is not contained in the automatic reproduction files. Thus, as shown in FIG. 10, the first dummy image such as all-zero data (i.e., solid black) is written in the area of the storage element 6 where the thumbnail image data of the ABC0001 file should otherwise be stored, through the image development unit 5.

Next, the thumbnail image of ABC0002.JPG is displayed. The control unit 8, informed through the read unit 4 that the ABC0002 file is stored in the automatic reproduction files, controls the read unit in such a manner as to detect the particular thumbnail image from the image file ABC0002 and read it from the image file storage medium 1 to the image development unit 5. The image development unit 5, under the control of the control unit 8, extends a JPEG-compressed image file to such a degree that it can be displayed on the image display unit 7 and develops it in the storage element 6. The image data developed in the storage element 6 is read from the image development unit 5, transferred to the image display unit 7 controlled by the control unit 8, and displayed on an arbitrary display unit. The automatic reproduction is not permitted for the files ABC0003 and ABC0004 from the contents described in the automatic reproduction file 3, and therefore the image display process is executed following the same procedure as the aforementioned ABC0001 file.

Next, the image file ABC0005 is displayed. Since the automatic reproduction of the file ABC0005 is permitted, the control unit 8 detects the thumbnail image from the image file ABC0005 and tries to perform the control operation to read the thumbnail file from the image file storage medium 1 to the image development unit 5. Since no thumbnail image is stored, however, as shown in FIG. 19, for example, user logo image data making up the second dummy image is written in an area of the storage element 6 where the thumbnail image of the ABC0005 file should otherwise be stored, through the image development unit 5. In the process, the presence or absence of the thumbnail image can be easily judged by retrieving a JPEG header of the thumbnail block.

With regard to the image file with the description of non-automatic reproduction in the automatic reproduction file 3, the thumbnail image is not necessary to display. Regardless of presence or absence of the thumbnail image, therefore, the device displays the first dummy image such as solid black. As a result, the user of the image reproduction device can easily distinguish between the thumbnail image of the image file which contains the description of non-automatic reproduction in the automatic reproduction file 3 and which is displayed in solid black on the one hand and the image file which contains the description of automatic reproduction in the automatic reproduction file 3 is displayed with the user logo on the other hand.

As described above, with the configuration according to this embodiment, the thumbnail image of the image file which contains the description of non-automatic reproduction in the automatic reproduction file 3 in the image file storage medium 1 is displayed as a first dummy image, while in the absence of the thumbnail image in spite of the description of automatic reproduction, a second dummy image is displayed. In this way, the user of the image reproduction device can retrieve a desired image file using a thumbnail display function.

Fifth Embodiment

Figure 20:
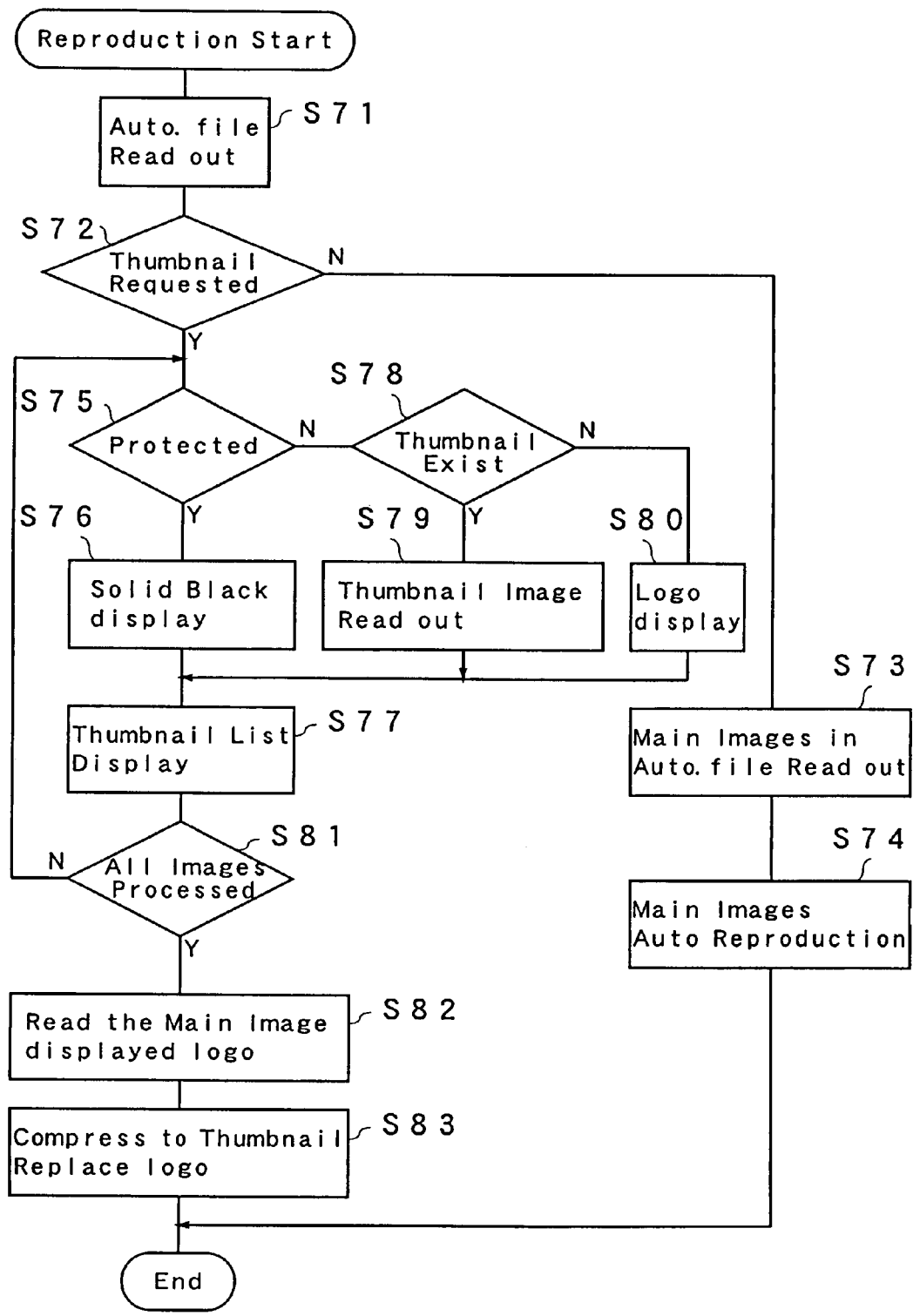
FIG. 20 is a flowchart showing an operation of an image reproduction device according to a fifth embodiment of the invention.

Next, a fifth embodiment of the invention is explained with reference to FIG. 20.

The configuration of the fourth embodiment poses the problem that even upon receipt of a thumbnail display request for the image file storing no thumbnail image, the thumbnail image display of the image file which contains the description of non-automatic reproduction in the automatic reproduction file 3 can be easily distinguished, but since the thumbnail image is not stored, the thumbnail cannot be displayed in spite of the image file which contains the description of automatic reproduction in the automatic reproduction file 3.

In view of this, this embodiment, after the thumbnail image list displays, reads the main image of the image file not storing the thumbnail image, and resizes this main image to a size of the thumbnail image for display. Then, at the time of displaying the thumbnail list, the device replaces the second dummy image on display with the particular thumbnail image thereby to solve the aforementioned problem. FIG. 20 is a flowchart showing the operation of the image reproduction device according to this embodiment. Incidentally, the same component parts as in the aforementioned embodiments are designated by the same reference numerals, respectively, and not described again.

First, operations of steps S71 to S82 after insertion of the image file storage medium 1 into the image reproduction device are same as the corresponding operations in the fourth embodiment and therefore are not described in detail. Upon complete display of all the images, the process proceeds to step S82 to display a second dummy image, in which case the device reads the main image of the image displayed in logo from the image file storage medium 1. Then, the process proceeds to step S83 to compress this image to the size of the thumbnail image and replaced with the logo image (step S83). This process is executed sequentially for each logo display image.

Like in the fourth embodiment, assume, for example, that 10 images files ABC0001.JPG to ABC0010.JPG are located in the lowest layer of DCIM and three images ABC0002.JPG, ABC0005.JPG and ABC0009.JPG are designated as an automatic reproduction file 3 and that the thumbnail image is not stored in the ABC0005 file. In this case, operations of steps S71 to S81 are the same as the operations described above. Specifically, the control unit 8 is informed, based on the information described in the automatic reproduction file 3, that the file ABC0001.JPG is not included in the automatic reproduction file. Thus, the all-zero (i.e., solid black) data is written in the area of the storage element 6 where the thumbnail image data of the ABC0001 file should otherwise be stored, through the image development unit 5 as shown in FIG. 10. Next, the image file ABC0002.JPG is displayed. The control unit 8, which is informed that the ABC0002 file is included in the automatic reproduction files, controls the read unit 4 in such a manner as to search the image file ABC0002 for the corresponding thumbnail image and read the thumbnail image from the image file storage medium 1 to the image development unit 5. The image development unit 5, under the control of the control unit 8, extends a JPEG-compressed image file to such a degree as to be displayed on the image display unit 7 and develops it in the storage element 6. The image data developed in the storage element 6 is read from the image development unit 5, transferred to the image display unit 7 controlled by the control unit 8 and displayed on an arbitrary display unit. Subsequently, with regard to the ABC0003 and ABC0004 files, which contains the description of non-automatic reproduction in the automatic reproduction file 3, the image display process is executed following a similar procedure to the ABC0001 file described above. Next, an image file of ABC0005.JPG is displayed. Since the control unit 8 is informed through the read unit 4 that the automatic reproduction files include the ABC0005 file, the user logo image data is written in an area of the storage element 6 where the thumbnail image data of the ABC0005 file should otherwise be stored, through the image development unit 5. In this way, a list of all the thumbnails is displayed temporarily.

Next, in step S82, the control unit 8, for lack of the thumbnail image, reads the main image data of the ABC0005 file constituting the thumbnail image displayed as a user logo through the read unit 4, and resizes the image data to a thumbnail image. The main image thus resized is replaced with the thumbnail image currently displayed as a user logo. As a result, the thumbnail image with the description of automatic reproduction in the automatic reproduction file of the image file storing the thumbnail image can be displayed. In this case, since the main image is read from the image file and resized to the thumbnail image, the time of resizing the image data cannot be shortened. The use of the configuration according to this embodiment, however, in which all the thumbnail images are displayed by some method regardless of the presence or absence of the thumbnail image, produces the effect of preventing the viewers from misunderstanding that the thumbnail display operation of the image reproduction device is suspended.

Normally, the number of image files displayed in the thumbnail image list is about several to 20, depending on resolution of a display unit used with the image reproduction device. With the ever increasing capacity of the image file storage medium, however, it is not a rare case that several tens to several hundreds of image files are stored in each image file storage medium. In such a case, all the thumbnail images of the image files cannot be displayed on one screen, and therefore 16 image files, for example, are displayed each time on the image reproduction device. In the process, assume that a thumbnail for the image file not storing the thumbnail image is displayed by resizing from the main image, the operation of switching the image from the first thumbnail image list (ABC0001 to ABC0016) to the second thumbnail image list (ABC0017 to ABC0032) is accompanied by the job to obtain the thumbnail image from the main image of the image file having no thumbnail image. As a result, it becomes a problem that a considerable length of time is required before the second thumbnail image list is displayed. Normally, the thumbnail image list is displayed for the purpose of searching the image files stored in the image file storage medium 1, and therefore demand is high for quickening the switching of the thumbnail image lists. When a request to switch the first thumbnail image list to the second thumbnail image list is input to the control unit 8 from the input unit 9, therefore, the process under execution by the image development unit 5 to resize the main image is suspended, and the first image file (the ABC0017 file in the aforementioned case) of the second thumbnail image is preferably displayed. With this operation, the thumbnail image list can be quickly switched.

As described above, with the configuration according to the invention, the image file, which contains the description of automatic reproduction in the automatic reproduction file 3 in the image file storage medium 1 but which has no thumbnail image data stored therein, is displayed first as a second dummy image. Next, after displaying the entire thumbnail image list, the second dummy image is resized from the main image and displayed so that all the thumbnails of the image files which contains the description of automatic reproduction in the automatic reproduction file 3 can be finally displayed.

Sixth Embodiment

Next, a sixth embodiment of the invention is explained with reference to FIGS. 21 to 23.

In the configuration of the second to fifth embodiments, the thumbnail image of the image file which contains the description of non-automatic reproduction in the automatic reproduction file 3 is displayed on the display unit as the first dummy image. As a result, even in the image reproduction device using a display unit such as a projector capable of displaying a image on a large screen, the user of the image reproduction device can withhold from displaying the image data not desired to be displayed to a multiplicity of unspecified third parties. In the configuration described above, however, the user may sometimes desire to display an image currently displayed as a dummy image for some reason or other by displaying a thumbnail image list. In such a case, according to the second to fifth embodiments, can confirm the image reproduction device the presence or absence of the desired image file in the image file storage medium 1, and further the name of the particular image file, and display as a main image. The thumbnail image of the particular image file, however, cannot be displayed in situ. A method which enables to display the thumbnail image is to update the automatic reproduction file 3. In this case, unless the user recognizes the update history of the image file storage medium 1, it becomes a problem that in a case where the thumbnail image is displayed on another occasion using the image file storage medium 1 updated in the preceding session, the thumbnail image, like the other image files which contains the description of automatic reproduction in the automatic reproduction file, is undesirably displayed to the third-party viewers of the image reproduction device.

This embodiment can solve the problem if the dummy thumbnail images of the image, which contains the description of non-automatic reproduction in the automatic reproduction file 3, can be individually changed to the thumbnail images.

Figure 21:
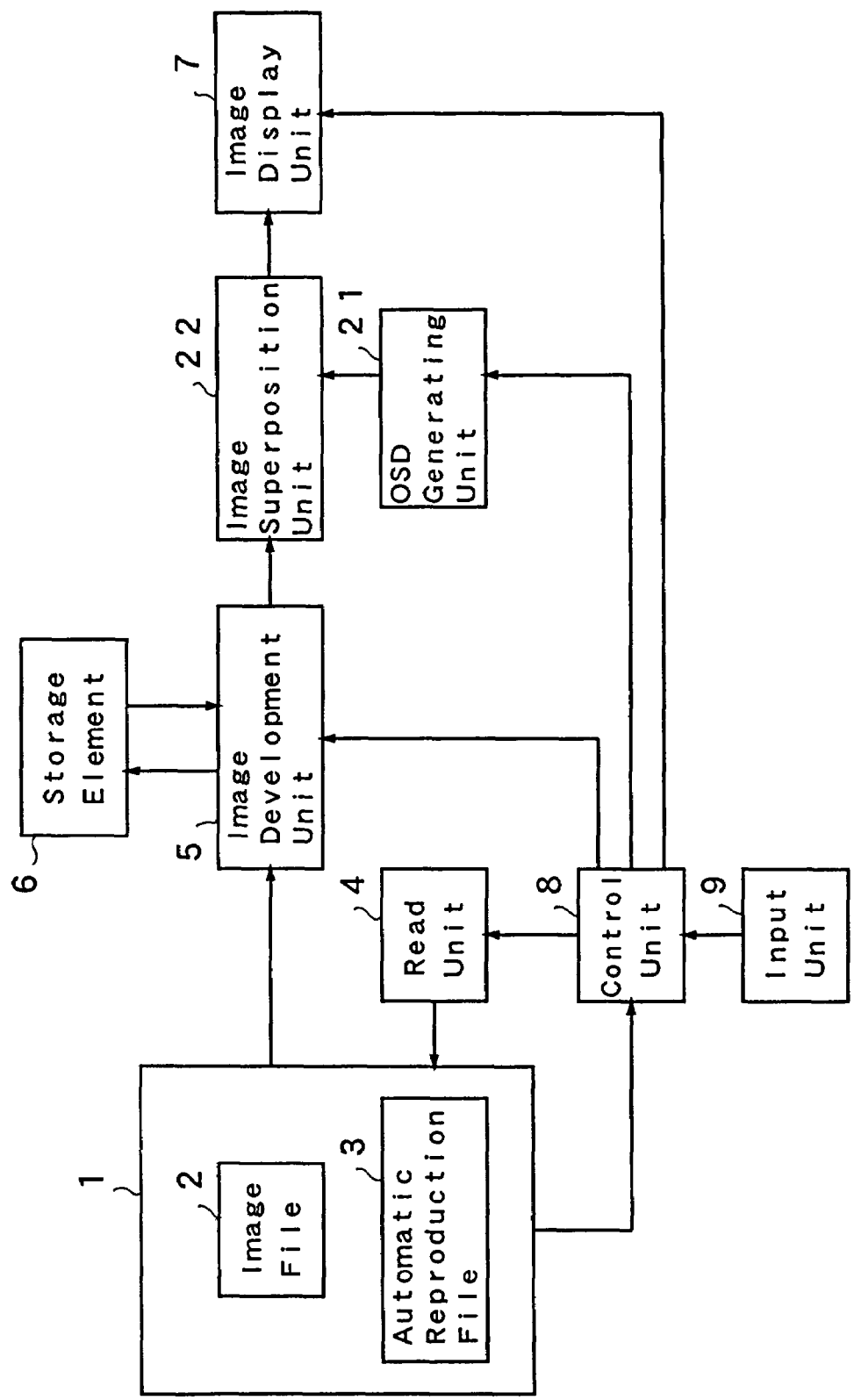
FIG. 21 is a block diagram showing a configuration of an image reproduction device according to a sixth embodiment of the invention.
Figure 22:
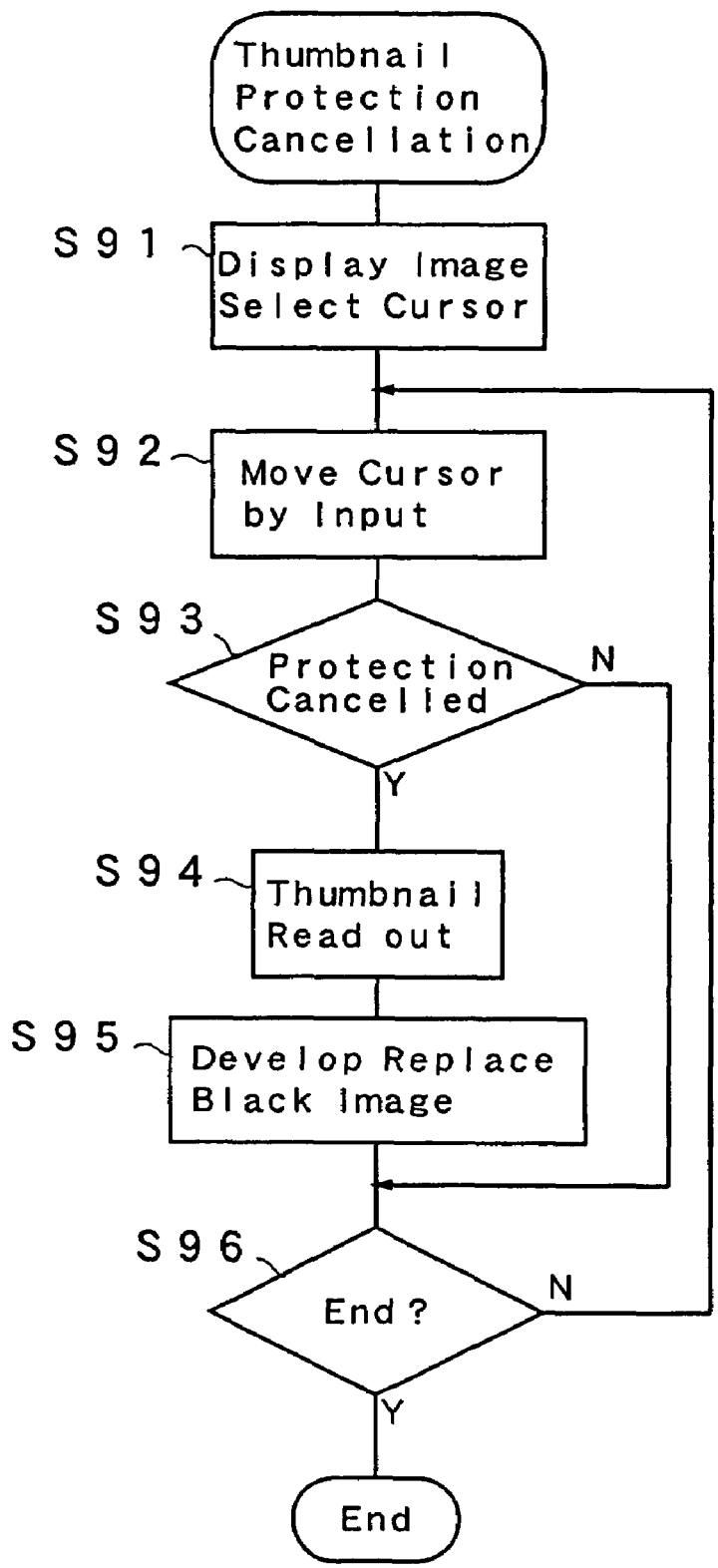
FIG. 22 is a flowchart showing an operation of the image reproduction device according to the sixth embodiment of the invention.

FIG. 21 is a block diagram showing a configuration of the image reproduction device according to this embodiment. In this embodiment, the same component parts as the corresponding ones in the aforementioned embodiments are designated by the same reference numerals, respectively, and not explained again. In FIG. 21, an OSD generating unit 21 is controlled by the control unit 8 to display an arbitrary OSD image on the image reproduction device. An image superposition unit 22 is to superpose the inputs thereto from the OSD generating unit 21 and the image development unit 5 and to output the superposed image data to the image display unit 7. The operation of the image reproduction device according to this embodiment is explained below with reference to a flowchart.

Figure 23:
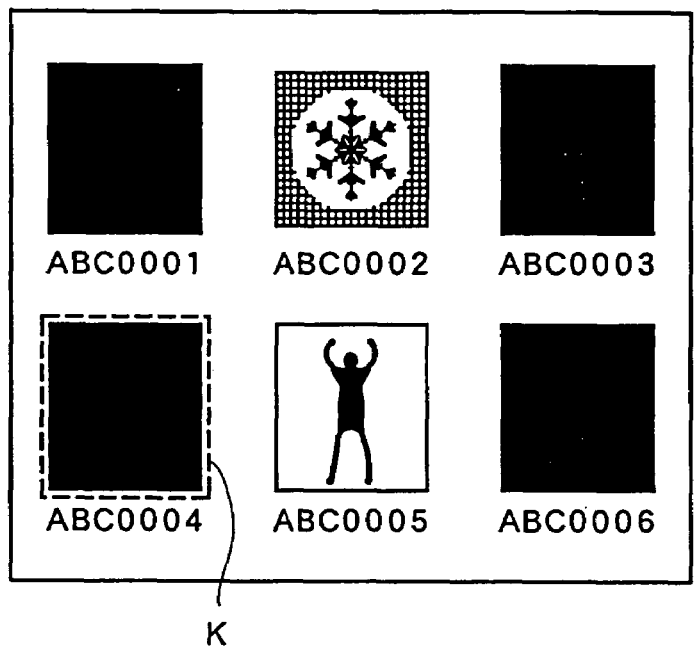
FIG. 23 is a diagram showing an image before protection cancellation setting according to the sixth embodiment of the invention.

First, as shown in the second embodiment, in the presence of a thumbnail image display request based on the contents described in the automatic reproduction file 3, the device displays a thumbnail image list as shown in FIG. 23 on the display unit. Assume that a request is received from the input unit 9 to change to an ordinary thumbnail image the thumbnail image of the solid-black image file which contains the description of non-automatic reproduction in the automatic reproduction file 3. The control unit 8 controls the OSD generating unit 21 to generate an image select cursor K as shown in FIG. 23, so that the image superposition unit 22 superposes the image select cursor on the original thumbnail image list (step S91). The image select cursor, based on the input information from the input unit 9, is moved by the units of the thumbnail image in four directions, i.e., upward, downward, leftward and rightward (step S92). In a case where the thumbnail display of the image file ABC0004 is changed from solid black to the normal thumbnail image, as shown in FIG. 23, for example, the first step is to move the image select cursor to the area of the thumbnail image (solid black display in this case) of ABC0004 and judge whether a protection cancellation request is issued or not from the input unit 9 (step S93).

Figure 24:
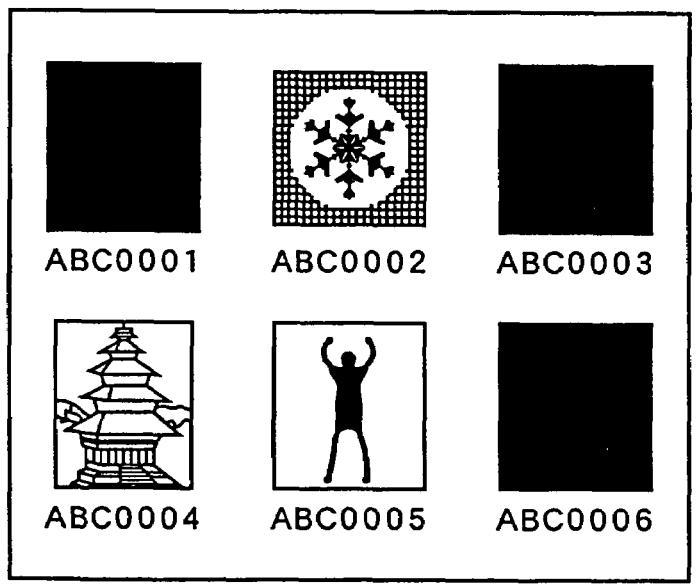
FIG. 24 is a diagram showing an image after protection cancellation setting according to the sixth embodiment of the invention.

In a case where the thumbnail image of the image file which the user of the image file storage medium 1 does not want to display to a third party is displayed in solid black as in this embodiment, a higher degree of security may be required. When the control unit 8 receives a determination command, therefore, a repeated confirmation is desirably made. In this way, the control unit 8 receives from the input unit 9 the request to change the display of the thumbnail image of the ABC0004 displayed in solid black to the normal thumbnail image display (step S93). Then, the process proceeds to step S94 and the control unit 8 transfers the thumbnail image data of ABC0004 to the image development unit 5 from the image files in the image file storage medium 1 through the read unit 4. The image development unit 5, in a desired format, overwrites the thumbnail image data on the area of the storage unit 6 where the thumbnail image data of ABC0004 is written. After that, the image data written in the storage element 6 is transferred to the image display unit 7 through the image superposition unit 22. With this operation, the thumbnail image of ABC0004 as shown in FIG. 24 replaced with a normal image is displayed on the display unit. The image superposition unit 22 is normally configured of a multiplier. In this case, the data input from the image development unit 5 is multiplied by 1 and the data input from the OSD generating unit 21 is multiplied by 0. In this way, the image data output from the image development unit 5 can be displayed through without superposition of the OSD image thereon.

With the configuration according to this embodiment, the thumbnail image of the image file protected by solid black or an arbitrary image display on this image reproduction device can be replaced with a normal thumbnail image without updating the automatic reproduction file 3 in the image file storage medium 1.

INDUSTRIAL APPLICABILITY

As described above, with the image reproduction device and method according to the invention, the thumbnail image of other than the image file which contains the description of automatic reproduction in the automatic reproduction file in the image file storage medium can be totally prevented from being displayed at the time of thumbnail image display, by reading the contents of the description of the automatic reproduction file in the image file storage medium.

Also, the information of the automatic reproduction file stored in the image file storage medium is read and the thumbnail image of the image file which contains the description of non-automatic reproduction in the automatic reproduction file is displayed as a dummy image, so that the presence of the image file can be recognized and the desired image file can be detected from all the image files in the image file storage medium.

Also, at the time of displaying the thumbnail of the image file which contains the description of non-automatic reproduction in the automatic reproduction file 3, the thumbnail image is not displayed as it is, but by changing to an image apparently unrecognizable by a third party. In this way, the desired image file can be retrieved.

Further, the presence or absence of the thumbnail image of the image file is judged, and with regard to the image file lacking the thumbnail image, the second dummy image is used as a thumbnail image. In this way, the user of the image reproduction device can easily distinguish the two. Furthermore, after displaying the second thumbnail image list, the second dummy image is replaced with the main image compressed to the size of the thumbnail image. In this way, all the thumbnails of the image file which contains the description of non-automatic reproduction in the automatic reproduction file can be finally displayed.

Also, the thumbnail display protected by displaying a dummy image on the image reproduction device is selectively displayed individually and thus can be easily replaced with the normal thumbnail image.

The invention claimed is:

1. An image reproduction device which displays an image file storage medium having stored therein a plurality of image files with main image information and thumbnail image information in an arbitrary format, and an automatic reproduction file containing at least the description as to whether the automatic reproduction of said plurality of the image files is permitted or not and order in which said image files are reproduced, the device comprising:

a read unit which reads each file information stored in said image file storage medium;

a control unit which performs a control operation in such a manner that said read unit reads from said image file storage medium a thumbnail image of the image file which contains the description of automatic reproduction in the automatic reproduction file;

an image development unit which develops the image file read by said read unit;

a storage element into which the image data developed by said image development unit are written; and an image display unit which reads and displays a list of the thumbnail images written in said storage element;

wherein said control unit reads thumbnail images of all the image files from said image file storage medium, and said image development unit develops the thumbnail image of the image file which contains the description of automatic reproduction in the automatic reproduction file read by said read unit as a normal image and, also, develops a thumbnail image of the image file which contains the description of non-automatic reproduction in said automatic reproduction file as an image difficult to recognize;

wherein said image development unit comprises:

a file extension unit which is supplied with the image file information stored in said image file storage medium to extend the image file;

a write address generating unit which generates a write address for said storage element; and a read address generating unit which generates a read address for said storage element, and when developing the thumbnail image of the image file which contains the description of non-automatic reproduction in the information of said automatic reproduction file, the write address for said storage element is generated discontinuously in accordance with a predetermined rule by said write address generating unit.

2. An image reproduction device which displays an image file storage medium having stored therein a plurality of image files with main image information and thumbnail image information in an arbitrary format, and an automatic reproduction file containing at least the description as to whether the automatic reproduction of said plurality of the image files is permitted or not and order in which said image files are reproduced, the device comprising:

a read unit which reads each file information stored in said image file storage medium;

a control unit which performs a control operation in such a manner that said read unit reads from said image file storage medium a thumbnail image of the image file which contains the description of automatic reproduction in the automatic reproduction file;

an image development unit which develops the image file read by said read unit;

a storage element into which the image data developed by said image development unit are written; and an image display unit which reads and displays a list of the thumbnail images written in said storage element;

wherein said control unit reads thumbnail images of all the image files from said image file storage medium, and said image development unit develops the thumbnail image of the image file which contains the description of automatic reproduction in the automatic reproduction file read by said read unit as a normal image and, also, develops a thumbnail image of the image file which contains the description of non-automatic reproduction in said automatic reproduction file as an image difficult to recognize;

wherein said image development unit comprises:

a file extension unit which is supplied with the image file information stored in said image file storage medium to extend the image file;

a write address generating unit which generates a write address for said storage element; and a read address generating unit which generates a read address for said storage element, and when developing the thumbnail image of the image file which contains the description of non-automatic reproduction in the information of said automatic reproduction file, the read address for said storage element is generated discontinuously in accordance with a predetermined rule by said read address generating unit.

3. An image reproduction device which displays an image file storage medium having stored therein a plurality of image files with main image information and thumbnail image information in an arbitrary format, and an automatic reproduction file containing at least the description as to whether the automatic reproduction of said plurality of the image files is permitted or not and order in which said image files are reproduced, the device comprising:

a read unit which reads each file information stored in said image file storage medium;

a control unit which performs a control operation in such a manner that said read unit reads from said image file storage medium a thumbnail image of the image file which contains the description of automatic reproduction in the automatic reproduction file;

an image development unit which develops the image file read by said read unit;

a storage element into which the image data developed by said image development unit are written; and an image display unit which reads and displays a list of the thumbnail images written in said storage element;

wherein said control unit reads thumbnail images of all the image files from said image file storage medium, and said image development unit develops the thumbnail image of the image file which contains the description of automatic reproduction in the automatic reproduction file read by said read unit as a normal image and, also, develops a thumbnail image of the image file which contains the description of non-automatic reproduction in said automatic reproduction file as an image difficult to recognize;

wherein said image development unit comprises:

a file extension unit which is supplied with the image file information stored in said image file storage medium to extend the image file;

a write address generating unit which generates a write address for said storage element; and a read address generating unit which generates a read address for said storage element, and when developing the thumbnail image of the image file which contains the description of non-automatic reproduction in the information of said automatic reproduction file, the write address for said storage element is generated discontinuously in accordance with a predetermined rule by said write address generating unit and, also, the read address for said storage element is generated discontinuously in accordance with a predetermined rule by said read address generating unit.

4. An image reproduction device which displays an image file storage medium having stored therein a plurality of image files with main image information and thumbnail image information in an arbitrary format, and an automatic reproduction file containing at least the description as to whether the automatic reproduction of said plurality of the image files is permitted or not and order in which said image files are reproduced, the device comprising:

a read unit which reads each file information stored in said image file storage medium;

a control unit which performs a control operation in such a manner that said read unit reads from said image file storage medium a thumbnail image of the image file which contains the description of automatic reproduction in the automatic reproduction file;

an image development unit which develops the image file read by said read unit;

a storage element into which the image data developed by said image development unit are written; and an image display unit which reads and displays a list of the thumbnail images written in said storage element;

wherein said storage element holds dummy image data corresponding to a thumbnail image, and said control unit performs the control operation in such a manner that a dummy image is read from said storage element in place of the thumbnail image of the image file which contains the description of non-automatic reproduction in said automatic reproduction file read by said read unit;

wherein said storage element holds first and second different dummy image data as said dummy images, and said control unit performs the control operation in such a manner that the first dummy image is read from said storage element in place of the thumbnail image of the image file which contains the description of non-automatic reproduction in the automatic reproduction file and, where the thumbnail image of the image file is not stored in said image file which contains the description of automatic reproduction in said automatic reproduction file at the time of reading said thumbnail image from said image file storage medium, said control unit performs the control operation in such a manner that said second dummy image is read from said storage element.

5. The image reproduction device according to claim 4, wherein said control unit performs a control operation in such a manner that after all the thumbnail images are output on an arbitrary screen, a main image of the image file having said thumbnail image not stored therein is read, and size of said main image is reduced to that of a thumbnail image, after which the image displayed as said second dummy image is replaced with said compressed thumbnail image.

6. The image reproduction device according to claim 4, further comprising:

an input unit for selectively determining whether the display of said dummy image of the thumbnail image displayed as said dummy image is canceled or not, wherein said control unit performs the control operation in such a manner that in a case where the display of said dummy image is canceled by said input unit, the thumbnail image corresponding to the image is read from said image file.

7. An image reproduction method which displays a thumbnail image of an image file storage medium having stored therein a plurality of image files and thumbnail image information in an arbitrary format, and an automatic reproduction file containing at least description of control information as to whether automatic reproduction of the plurality of the image files is permitted or not and order in which the image files are reproduced, comprising the steps of:

reading the automatic reproduction file information stored in the image file storage medium;

reading a thumbnail image information file of the image file which contains the description of automatic reproduction in the automatic reproduction file, from the image file storage medium; and displaying a list of the thumbnail images that have been read;

displaying a thumbnail image of an image file which contains the description of automatic reproduction in said automatic reproduction file as a thumbnail image as it is; and developing a thumbnail image of an image file which contains the description of non-automatic reproduction in said automatic reproduction file as an image difficult to recognize and displaying the thumbnail image;

said developing step comprises:

extending an image file in response to an input of said image file information stored in said image file storage medium;

when displaying the thumbnail image of the image file which contains the description of non-automatic reproduction in said automatic reproduction file stored in said image file storage medium, generating a write address discontinuously in accordance with a predetermined rule for a storage element into which the extended image data is written; and generating a read address sequentially when reading the image data written in said storage element.

8. An image reproduction method which displays a thumbnail image of an image file storage medium having stored therein a plurality of image files and thumbnail image information in an arbitrary format, and an automatic reproduction file containing at least description of control information as to whether automatic reproduction of the plurality of the image files is permitted or not and order in which the image files are reproduced, comprising the steps of:

reading the automatic reproduction file information stored in the image file storage medium;

reading a thumbnail image information file of the image file which contains the description of automatic reproduction in the automatic reproduction file, from the image file storage medium; and displaying a list of the thumbnail images that have been read;

displaying a thumbnail image of an image file which contains the description of automatic reproduction in said automatic reproduction file as a thumbnail image as it is; and developing a thumbnail image of an image file which contains the description of non-automatic reproduction in said automatic reproduction file as an image difficult to recognize and displaying the thumbnail image;

said developing step comprises:

extending an image file in response to an input of said image file information stored in said image file storage medium;

generating the write address to said storage element sequentially; and when displaying a thumbnail image of an image file which contains the description of non-automatic reproduction in the information of said automatic reproduction file stored in said image file storage medium, generating a read address for reading the image data written in said storage element discontinuously in accordance with a predetermined rule.

9. An image reproduction method which displays a thumbnail image of an image file storage medium having stored therein a plurality of image files and thumbnail image information in an arbitrary format, and an automatic reproduction file containing at least description of control information as to whether automatic reproduction of the plurality of the image files is permitted or not and order in which the image files are reproduced, comprising the steps of:

reading the automatic reproduction file information stored in the image file storage medium;

reading a thumbnail image information file of the image file which contains the description of automatic reproduction in the automatic reproduction file, from the image file storage medium; and displaying a list of the thumbnail images that have been read;

displaying a thumbnail image of an image file which contains the description of automatic reproduction in said automatic reproduction file as a thumbnail image as it is; and developing a thumbnail image of an image file which contains the description of non-automatic reproduction in said automatic reproduction file as an image difficult to recognize and displaying the thumbnail image;

said developing step comprises:

extending an image file in response to an input of said image file information stored in said image file storage medium;

when displaying a thumbnail image of an image file which contains the description of non-automatic reproduction in the information of said automatic reproduction file stored in said image file storage medium, generating a write address for the storage element into which the extended image data is written discontinuously in accordance with a predetermined rule; and generating a read address for reading the image data written in said storage element discontinuously in accordance with a predetermined rule.

10. An image reproduction method which displays a thumbnail image of an image file storage medium having stored therein a plurality of image files and thumbnail image information in an arbitrary format, and an automatic reproduction file containing at least description of control information as to whether automatic reproduction of the plurality of the image files is permitted or not and order in which the image files are reproduced, comprising the steps of:

reading the automatic reproduction file information stored in the image file storage medium;

reading a thumbnail image information file of the image file which contains the description of automatic reproduction in the automatic reproduction file, from the image file storage medium; and displaying a list of the thumbnail images that have been read;

displaying the image file with the description of non-automatic reproduction in said automatic reproduction file as a dummy image in place of the thumbnail image;

holding first and second different dummy image data as said dummy images;

displaying a thumbnail image of an image file which contains the description of non-automatic reproduction in said automatic reproduction file as a first dummy image; and displaying said second dummy image where a thumbnail image of the image file which contains the description of automatic reproduction in said automatic reproduction file is read from said image file storage medium and not stored in said image file.

11. The image reproduction method according to claim 10, comprising:

outputting all the thumbnail images on an arbitrary screen;

reading a main image of an image file having no thumbnail images therein; and after minimizing a size of said main image to a size of said thumbnail image, replacing the image displayed as said second dummy image with said compressed thumbnail image.

* * * * *